(12) United States Patent
Saita

(10) Patent No.: US 11,180,036 B2
(45) Date of Patent: Nov. 23, 2021

(54) NON-CONTACT POWER TRANSMISSION SYSTEM

(71) Applicant: HONDA MOTOR CO., LTD., Tokyo (JP)

(72) Inventor: Akira Saita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 16/499,086

(22) PCT Filed: Mar. 23, 2018

(86) PCT No.: PCT/JP2018/011668
§ 371 (c)(1),
(2) Date: Sep. 27, 2019

(87) PCT Pub. No.: WO2018/180973
PCT Pub. Date: Oct. 4, 2018

(65) Prior Publication Data
US 2020/0039372 A1 Feb. 6, 2020

(30) Foreign Application Priority Data
Mar. 31, 2017 (JP) .............................. JP2017-073247

(51) Int. Cl.
*H02J 50/90* (2016.01)
*H02J 50/10* (2016.01)
(Continued)

(52) U.S. Cl.
CPC .............. *B60L 50/50* (2019.02); *B60L 50/60* (2019.02); *B60L 53/126* (2019.02); *B60L 53/36* (2019.02);
(Continued)

(58) Field of Classification Search
USPC ....................................................... 320/108
See application file for complete search history.

(56) References Cited

U.S. PATENT DOCUMENTS

2015/0217648 A1   8/2015  Ichikawa et al.
2016/0318413 A1*  11/2016 Roehrl .................... H02J 50/60
(Continued)

FOREIGN PATENT DOCUMENTS

JP          2015-126658 A    7/2015
JP              5937631 B2    6/2016

OTHER PUBLICATIONS

PCT/ISA/210 from International Application PCT/JP2018/011668 with the English translation thereof.

*Primary Examiner* — Bryce M Aisaka
(74) *Attorney, Agent, or Firm* — Carrier Blackman & Associates, P.C.; Joseph P. Carrier; Jeffrey T. Gedeon

(57) ABSTRACT

Provided s a non-contact power transmission system with which it is possible to individually detect the position of a receiving unit with respect to a transmission unit, even if there are positions at which the same microvoltage values are indicated, even if the distance differs, due to the shape of the transmission coil of the transmission unit and the receiving coil of the receiving unit. At a position at which the position differential value of the detected microvoltage exceeds a zero value, said positions set to the initial position (+xint) of the movement displacement of the vehicle, and the movement displacement on the basis of vehicle velocity is calculated to a position (+xc) at which the microvoltage value characteristics can be used from said initial position to (+xc to 0).

3 Claims, 18 Drawing Sheets

(51) Int. Cl.
*B60L 50/50* (2019.01)
*B60L 53/126* (2019.01)
*B60L 50/60* (2019.01)
*B60L 53/36* (2019.01)
*B60L 53/38* (2019.01)
*H01F 38/14* (2006.01)

(52) U.S. Cl.
CPC .............. *B60L 53/38* (2019.02); *H02J 50/10* (2016.02); *H02J 50/90* (2016.02); *H01F 38/14* (2013.01)

(56) References Cited

U.S. PATENT DOCUMENTS

| | | |
|---|---|---|
| 2017/0001532 A1 | 1/2017 | Taniguchi |
| 2018/0248395 A1* | 8/2018 | Kikuchi .................. G06T 11/60 |
| 2019/0210477 A1* | 7/2019 | Kawa ..................... H02J 50/90 |

* cited by examiner

[x=0, y=0]
[vlpe=vlpemax]

(x=0, y=ya)

(x<xc, y=0)

Sp=R

Sp=R

NON-CONTACT POWER TRANSMISSION SYSTEM

TECHNICAL FIELD

The present invention relates to a non-contact power transmission system that carries out positioning of a vehicle including an energy storage device with respect to a charging station.

BACKGROUND ART

In this type of non-contact power transmission system, main charging of the energy storage device of the vehicle is carried out with a steady power (normal power) transmitted from the charging station, after the vehicle body has been positioned with respect to the charging station.

Although such positioning is performed prior to main charging, when such positioning is performed, a weak power for positioning is transmitted from the charging station, from the viewpoints of power savings, suppression of electromagnetic interference (EMI), and the like.

The vehicle having received the weak power travels for the purpose of performing positioning on the basis of the weak power, so as to position the vehicle at the charging station.

At the position of the charging station, the vehicle having been positioned carries out main charging in a non-contact manner with respect to the energy storage device of the vehicle, by means of a large steady power that has been switched to from the weak power.

For example, Japanese Patent No. 5937631 (hereinafter referred to as JP5937631B) discloses a non-contact power transmission system that transmits a weak power from a power transmission unit of a charging station that has received a power transmission request signal from a vehicle, and upon the start of detection of the weak power by a power reception unit of the vehicle, performs positioning at the charging station (power transmission unit) on the basis of the intensity of the weak power (power reception voltage) (see paragraph [0029] of JP5937631B).

SUMMARY OF INVENTION

In JP5937631B, it is disclosed that a distance detection unit detects the distance of the power reception unit with respect to the power transmission unit, in accordance with a power reception voltage generated by the weak power at both ends of a resistor (see paragraphs [0039] and [0040] and FIGS. 1 and 2 of JP5937631B).

Normally, the weak power is generated from a power transmitting coil disposed in the charging station, and the weak power generated from the power transmitting coil is detected by a power receiving coil that includes a distance detection unit, and is regarded as the power reception voltage.

However, the power transmitting coil and the power receiving coil each have a finite shape and dimension, and in the case of such a configuration, even in the event that the power receiving coil moves linearly toward the power transmitting coil after the power reception voltage value (weak voltage value) due to the weak power has started being detected by the power receiving coil, a characteristic is exhibited in which the power reception voltage does not increase monotonically, due to the presence of a unique region in which the weak power does not increase monotonically.

More specifically, in the case that the power receiving coil moves linearly toward the power transmitting coil, although the weak voltage value increases monotonically from a zero value initially after the time at which detection is started, the weak voltage has a characteristic in which it reaches an initial maximum value, and thereafter, decreases monotonically to a zero value (approximately zero value) from the maximum value, and furthermore, increases monotonically from a minimum value which is the zero value to another maximum value (a maximum value at a position when the center of the power receiving coil coincides with the center of the power transmitting coil as viewed in plan) that exceeds the initial maximum value.

In this case, with the distance detection unit disclosed in JP5937631B, because there are positions that exhibit the same weak voltage value irrespective of the fact that the distance is different, it becomes impossible to uniquely detect the position of the power receiving coil with respect to the power transmitting coil, and as a result, a sense of discomfort or lack of ease is imparted to a vehicle occupant such as the driver or the like.

The present invention has been devised taking into consideration the aforementioned problems and knowledge, and has the object of providing a non-contact power transmission system, in which it is possible to uniquely detect the position of the power reception unit with respect to the power transmission unit, even in the case that, due to characteristics of the shapes of the power transmitting coil of the power transmission unit and the power receiving coil of the power reception unit, there are positions at which the same weak voltage value is exhibited even though the distance differs.

Further, another object of the present invention is to provide a non-contact power transmission system, in which it is possible to optimize the charging efficiency with respect to the energy storage device of the vehicle.

A non-contact power transmission system according to the present invention comprises a charging station having a power transmission unit configured to transmit a weak power, and a vehicle having a power reception unit configured to receive the weak power in a non-contact manner, a control unit of the vehicle comprising a voltage value detection unit configured to detect a weak voltage value of the weak power received by the power reception unit, a position differentiation unit configured to perform position differentiation of the detected weak voltage value, in order to determine whether or not the detected weak voltage value is a voltage value due to the weak power, and a movement displacement amount detection unit configured to detect a movement displacement amount of the vehicle, wherein, during traveling of the vehicle in a manner so that the power reception unit of the vehicle approaches the power transmission unit, when a position at which a position differential value of the weak voltage value calculated by the position differentiation unit exceeds a zero value is reached, the position is set to an initial position of the movement displacement amount of the vehicle.

According to the present invention, the distance from the power transmission unit to an outer edge of a weak power detecting range within which it is possible to detect the weak power from the power transmission unit, i.e., the distance from the power transmission unit to the initial position, is known in advance. Therefore, during traveling of the vehicle in a manner so that the power reception unit of the vehicle approaches the power transmission unit, when a position (distance) at which the position differential value of the weak voltage value calculated by the position differentiation unit exceeds the zero value is reached, the position (distance) is set to the initial position of the movement displacement mount of the vehicle, whereby it is possible to reliably position the power reception unit with respect to the power transmission unit.

In this case, there may further be provided a storage unit configured to store a correspondence relation between the weak voltage value (predetermined voltage value) which is greater than or equal to a predetermined value, and an amount of displacement of the vehicle, and a vehicle speed sensor configured to detect a vehicle speed of the vehicle, wherein, if the weak voltage is less than the predetermined value, the movement displacement amount detection unit calculates the movement displacement amount based on the vehicle speed, and if the weak voltage is greater than or equal to the predetermined voltage value (predetermined value), the movement displacement amount detection unit calculates the movement displacement amount by referring to the correspondence relation in accordance with the detected weak voltage value.

The movement displacement amount is calculated based on the vehicle speed from the initial position to the position at which the weak voltage value becomes the predetermined voltage value, and from the position at which the weak voltage value has become the predetermined voltage value up to the position (transmission unit center position) where the maximum peak value is obtained, the movement displacement amount is calculated with reference to the correspondence relation in accordance with the detected weak voltage value.

For this reason, for example, even if there is a position where the weak voltage value adopts a minimum value on a route from the initial position to the power transmission unit center position, the movement displacement amount is calculated on the basis of the vehicle speed at the position where the minimum value is adopted, and therefore, the power reception unit of the vehicle can be positioned more reliably from the initial position of the weak power (initial detected position of the weak voltage value) until reaching the center position of the power transmission unit.

Further, the correspondence relation may be a characteristic depending on a difference in height with respect to a horizontal plane between a power transmitting coil of the power transmission unit and a power receiving coil of the power reception unit.

By referring to the weak voltage value characteristic in accordance with the difference in height with respect to a horizontal plane between the power transmitting coil and the power receiving coil, it is possible to perform accurate positioning at a location of any arbitrary charging station location where such a difference in height is known.

According to the present invention, it is possible to optimize the charging efficiency with respect to the energy storage device of the vehicle.

DESCRIPTION OF EMBODIMENTS

[Configuration]

Figure 1:
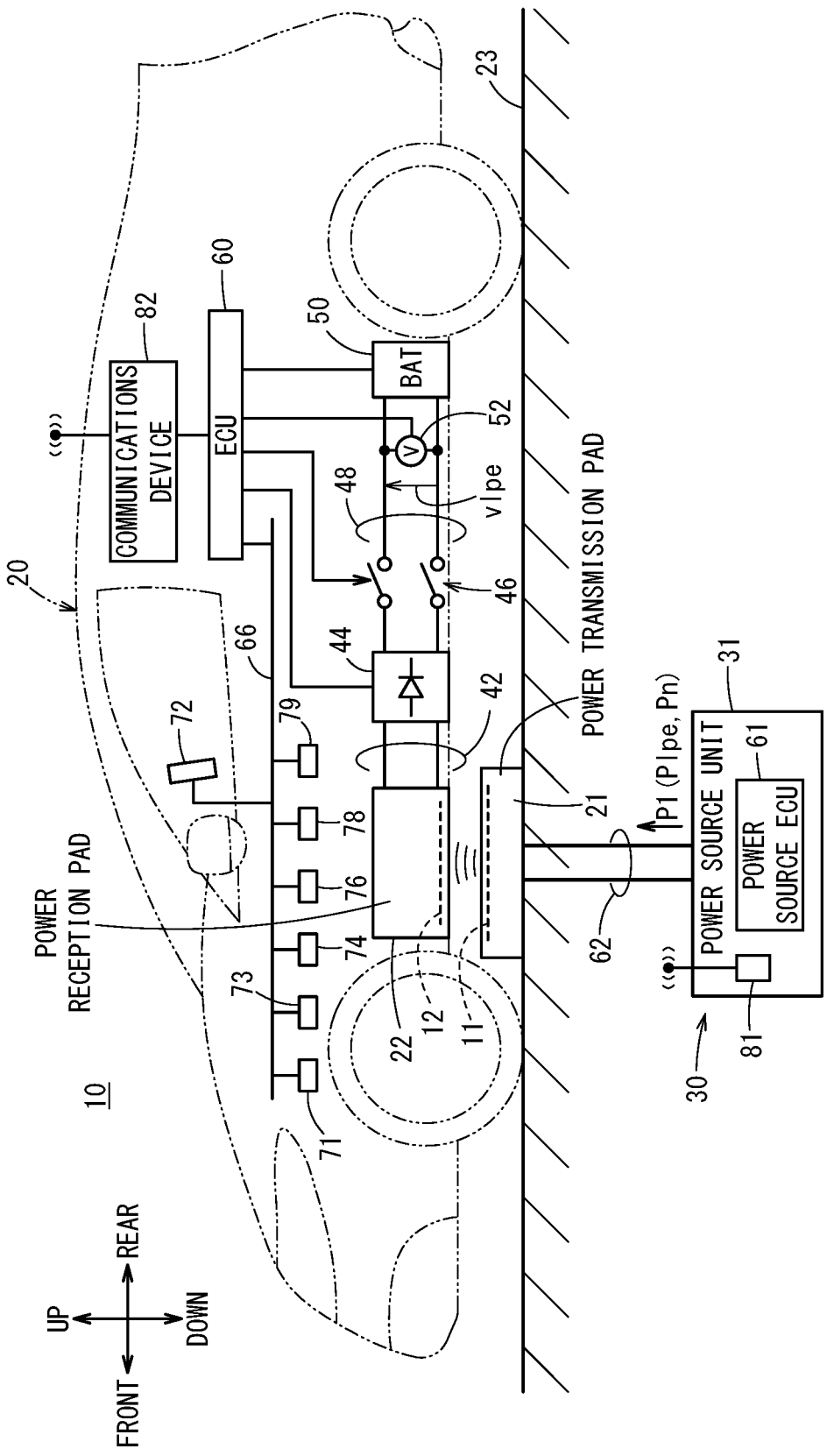
FIG. 1 is a schematic side view of a non-contact power transmission system according to an embodiment.
Figure 2:
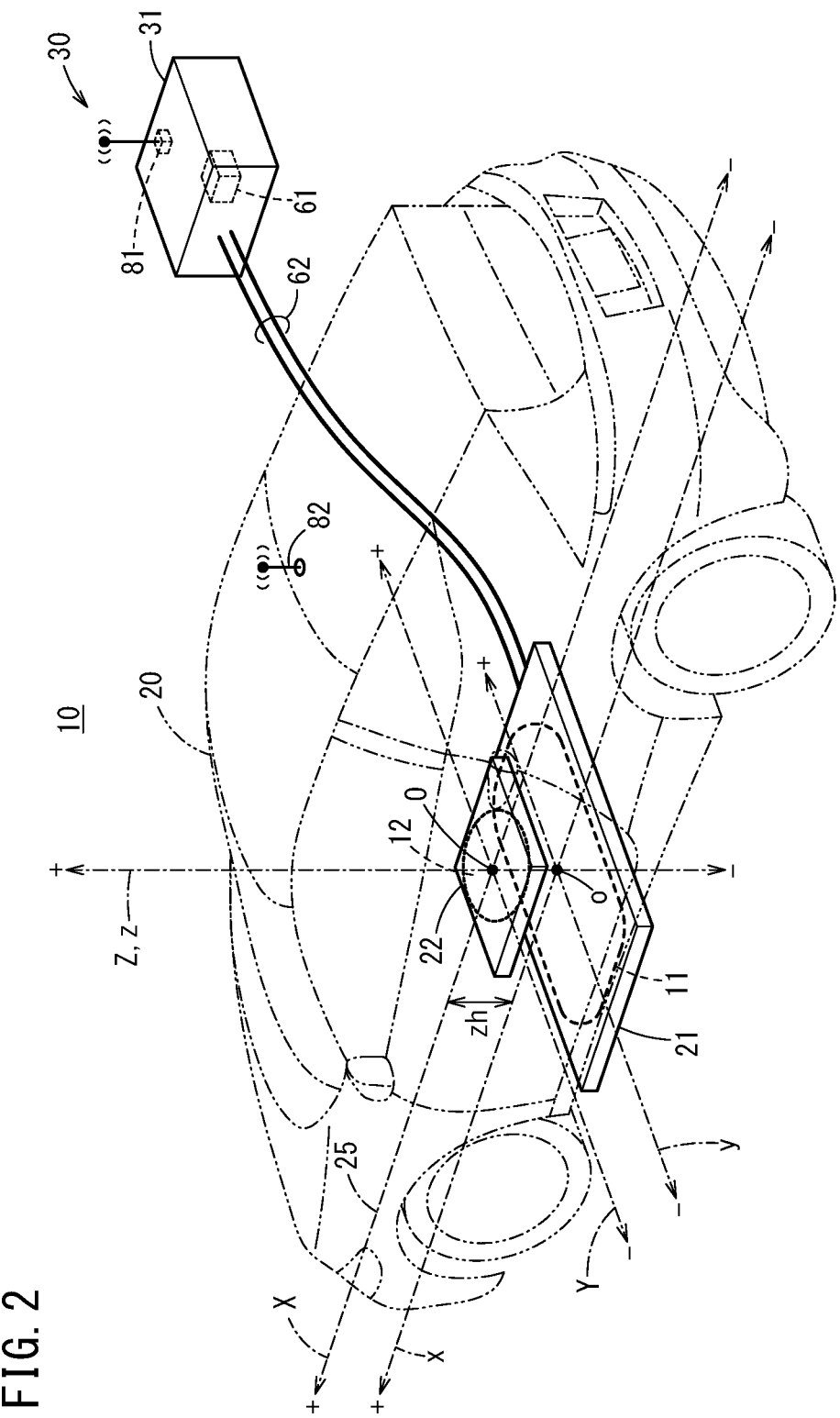
FIG. 2 is a schematic perspective view of the non-contact power transmission system shown in FIG. 1.

FIG. 1 is a schematic side view of a non-contact power transmission system 10 according to an embodiment, and FIG. 2 is a schematic perspective view of the non-contact power transmission system 10 shown in FIG. 1.

As shown in FIGS. 1 and 2, the non-contact power transmission system 10 basically includes a charging station 30 and a vehicle 20 equipped with an energy storage device (BAT) 50 which is a battery.

The energy storage device 50 of the vehicle 20 is charged in a non-contact manner (wirelessly) from the charging station 30.

The charging station 30 includes a power transmission pad (primary pad) 21 as a power transmission unit that is provided on a road surface such as a ground surface 23 or the like, and a power source unit 31 that supplies to a power transmitting coil 11 in the power transmission pad 21 an AC power with a reference frequency fr through a cable 62. The reference frequency fr is higher than a low frequency, for example, a commercial frequency ranging from 50 Hz to 60 Hz, and less than or equal to several hundreds of kilohertz [kHz].

According to the present embodiment, as illustrated schematically in FIG. 1, the power transmission pad 21 is provided on the ground surface 23 of a parking space or the like.

The vehicle 20 is an electric vehicle (EV), a plug-in hybrid vehicle (PHV), or a plug-in fuel cell vehicle (PFCV), and includes a power reception pad (secondary pad) 22 as a power reception unit that is provided on a bottom part of the vehicle 20. The power reception pad 22 includes a power receiving coil 12 as a secondary coil.

Figure 3A:
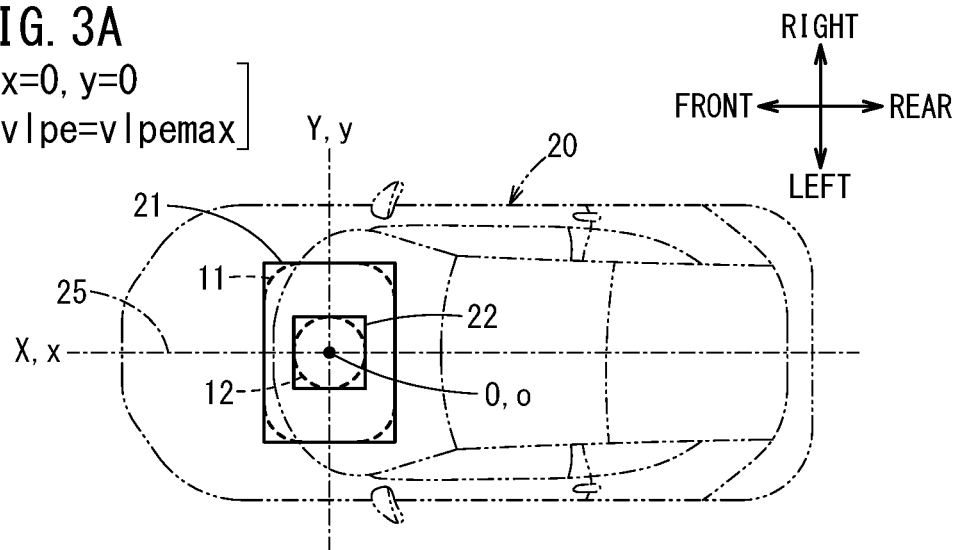
FIG. 3A is a schematic plan view illustrating a state in which a power reception pad is positioned accurately at a power transmission pad.

FIG. 3A is a schematic plan view illustrating a state in which the power reception pad 22 is positioned at the power transmission pad 21 of the charging station 30. The power reception pad 22 is disposed symmetrically with respect to a vehicle body center line 25 of the vehicle 20. In FIG. 3A, the arrows indicate a forward direction, a rearward direction, a lefthand direction, and a righthand direction of the vehicle 20.

In the same manner as in FIG. 3A, FIGS. 1 and 2 illustrate a state in which the power reception pad 22 is positioned at the power transmission pad 21. It should be noted that, in FIG. 1, the arrows indicate a frontward direction, a rearward direction, a downward direction, and an upward direction of the vehicle 20.

In the positioned state, a main surface of the power transmitting coil 11 (generally, an upper surface of the power transmission pad 21) and a main surface of the power receiving coil 12 (generally, a bottom surface of the power reception pad 22) face toward one another in a parallel state.

In FIGS. 2 and 3A, the power receiving coil 12 on the side of the vehicle 20 is of a circular shape, as shown by the bold dashed line, within the power reception pad 22 which is of a square shape. On the other hand, the power transmitting coil 11 on the side of the charging station 30 is of an approximately lateral elongate elliptical shape, as shown by the bold dashed line, within the power transmission pad 21 which is of a rectangular shape.

It should be noted that the power transmitting coil 11 and the power receiving coil 12 may also have a quadrangular shape (a square or rectangular shape), or alternatively, a circular shape.

As shown in FIG. 1, the power source unit 31 of the charging station 30 includes a power source electronic control unit (ECU) 61, and a communications device 81 equipped with a transmission/reception antenna. The power source unit 31 is connected to a non-illustrated commercial AC power source operating at a frequency from 50 Hz to 60 Hz.

The power source unit 31 generates a transmission power P1 of a low frequency on the order of several tens of kilohertz, for example, from the AC power source, and supplies the power to the power transmitting coil 11 of the power transmission pad 21 through the cable 62. Moreover, the transmission power P1 is switched by the power source ECU 61 between a weak power Plpe (lpe: low power excitation) in accordance with a weak current for positioning, and a main power Pn (Plpe<<Pn) in accordance with a normal current for main charging. From the power transmission pad 21, there is transmitted the weak power (the weak power is also referred to as Plpe) corresponding to the weak power Plpe, or alternatively, the main power (the main power is also referred to as Pn) corresponding to the main power Pn.

In FIG. 2, a positioning process is executed by causing the vehicle 20 to travel in a manner so that xyz-axes drawn on the power transmission pad 21 (power transmitting coil 11) coincide with XYZ-axes drawn on the power reception pad 22 (power receiving coil 12) of the vehicle 20, respectively, as viewed in plan. Moreover, an original position (coordinate origin point) o of the xyz-axes (xyz coordinates) of the power transmission pad 21 (power transmitting coil 11) is regarded as the center of the power transmitting coil 11, and an original position (coordinate origin point) O of the XYZ-axes (XYZ coordinates) of the power reception pad 22 (power receiving coil 12) is regarded as the center of the power receiving coil 12.

Thus, the positioning process is a process that causes the center of the power receiving coil 12 (coordinate origin point O) of the power reception pad 22 of the vehicle 20 to coincide with the center of the power transmitting coil 11 (coordinate origin point o) of the power transmission pad 21 of the charging station 30, as viewed in plan.

When both centers (coordinate origin points O, o) are made to coincide with each other (the z-axis and the Z-axis coincide with each other), even if the XY-axes of the power transmission pad 21 (power transmitting coil 11) are rotated with respect to the xy-axes of the power reception pad 22 (power receiving coil 12), the power transmission efficiency (power reception efficiency=Prn/Pn=received power of the power reception pad 22/transmitted power of the power transmission pad 21) does not change.

As shown in FIG. 1, the power reception pad 22 of the vehicle 20 is connected to the energy storage device 50 through a wire 42, a rectifier 44, a wire 48 equipped with a contactor 46, and a voltage sensor 52.

The rectifier 44, the contactor 46, and the energy storage device 50 are controlled by an electronic control unit (ECU) 60.

Furthermore, the ECU 60 is connected to an in-vehicle communication line 66 in order to control the vehicle 20 as a whole.

The in-vehicle communication line 66 is connected to a rear camera (imaging device) 71 used for observing a rearward direction of the vehicle 20, and a display unit (display device) 72 that also serves as an input device (touch sensor) to be operated by a vehicle occupant such as a driver or the like. Apart therefrom, the in-vehicle communication line 66 is also connected to a speaker/buzzer 73, a vehicle speed sensor 74, an accelerator pedal sensor 76, a steering angle sensor 78, and a shift position sensor 79, etc. The ECU 60 utilizes the vehicle information detected by the sensors 74, 76, 78, and 79 {a vehicle speed Vv, an accelerator pedal opening (accelerator opening) θa, a steering angle (corresponding to a directional angle of the front wheels) θs, and a gear shift position Sp (parking position P, reverse position R, neutral position N, drive position D)}.

As the display unit 72, for example, a display unit of a navigation device disposed on the dashboard may be used, and on the display unit 72, the ECU 60 displays positioning progress information or the like as information for assisting the driver in carrying out traveling in order to position the vehicle.

The ECU 60 of the vehicle 20 performs communications such as pairing with the power source ECU 61 through a communications device 82 including a transmission/reception antenna that is connected to the ECU 60, and the communications device 81 of the power source unit 31 of the charging station 30.

In the present embodiment, a positioning process is carried out in which the power reception pad 22 is positioned with respect to the power transmission pad 21 of the charging station 30, in a manner whereby the driver drives and steers the vehicle 20 while observing the information (positioning progress status) on the display unit 72 for assisting the driver in positioning the vehicle 20. However, the positioning process may also be performed by so-called automated parking.

Figure 4:
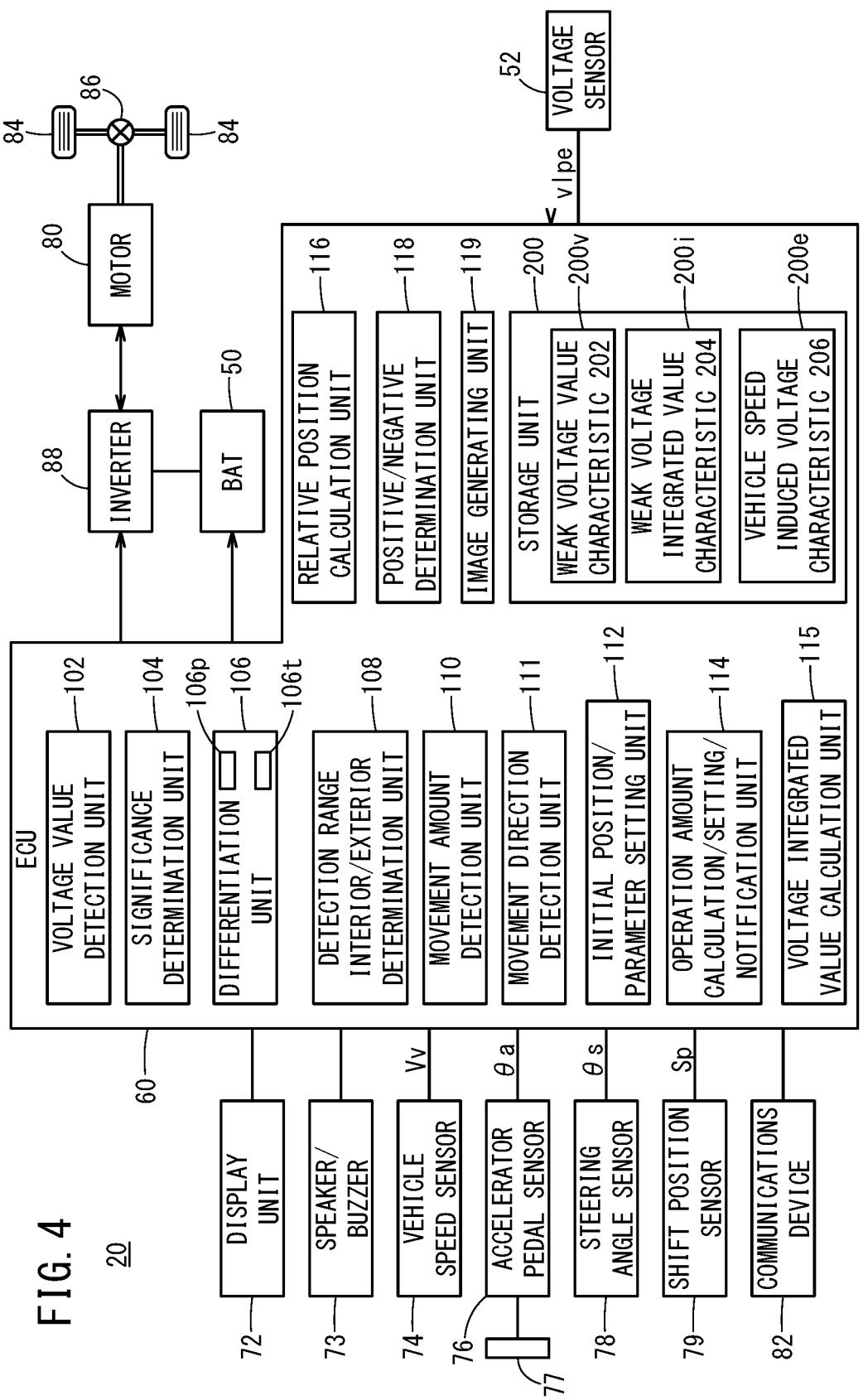
FIG. 4 is a functional block diagram of a vehicle.

FIG. 4 is a functional block diagram of the vehicle 20.

In the vehicle 20, drive wheels 84 are driven to rotate mechanically by a motor 80 through a transmission 86. The motor 80 is driven to rotate electrically through an inverter 88 that serves as a driving device.

DC power is supplied from the energy storage device 50 to a power source input terminal of the inverter 88. An on/off control signal of a switching element is supplied from the ECU 60 to a control input terminal of the inverter 88. The on/off control signal is used in order to convert the DC power from the energy storage device 50 into a three-phase power (three-phase AC power) in accordance with an accelerator pedal opening θa or the like output from the accelerator pedal sensor 76.

The motor 80 for driving the vehicle is power-driven by the three-phase AC power, and a torque of the motor 80 is transmitted to the drive wheels 84 of the vehicle 20 through the transmission 86. In addition to a driving mechanism including the motor 80, the vehicle 20 includes a steering mechanism including a steering wheel, an electric power steering device, and the like, and a braking mechanism including an electric brake, a disk brake, and the like, none of which are shown.

Each of the power source ECU 61, which is a control unit of the charging station 30, and the ECU 60, which is a control unit of the vehicle 20, is a calculating device including a microcomputer, which in addition to a CPU (central processing unit), a ROM (including an EEPROM) and a RAM (random access memory) as memories, further includes input/output devices such as an A/D converter, a D/A converter, and the like, and a timer that functions as a timing unit. By the CPUs thereof reading out and executing programs stored in the ROMs, the ECUs function as various function realizing units (function realizing means), for example, a controller, a computation unit, and a processing unit, etc. The functions thereof can also be realized in the form of hardware. Instead of one individual ECU, the ECU 60 may be divided into a plurality of units such as a vehicle ECU, a charging ECU, an energy storage device ECU, and the like.

In the present embodiment, the ECU 60 includes a voltage value detection unit 102 that acquires a weak voltage value (reception voltage) vlpe detected by the voltage sensor 52, a significance determination unit 104 for determining the significance of the weak voltage vlpe, a differentiation unit 106 including a position differentiation unit 106p and a time differentiation unit 106t, a detection range interior/exterior determination unit 108 for determining whether the weak power lies inside or outside of the detection range, a movement amount detection unit (movement displacement amount detection unit) 110, a movement direction detection unit 111, an initial position/parameter setting unit 112, an operation amount calculation/setting/notification unit 114, a weak voltage integrated value calculation unit 115, a relative position calculation unit (position detection unit) 116 that calculates (detects) a position (relative position) of the power receiving coil 12 relative to the power transmitting coil 11, a positive/negative determination unit 118 that determines whether the power receiving coil 12 exists on a positive side (see FIG. 2) or a negative side (see FIG. 2) on an x-axis of the power transmitting coil 11, and an image generating unit 119 that generates an image for assisting in positioning, and the like.

Furthermore, within a storage unit 200 thereof, the ECU 60 stores a voltage value characteristic (also referred to as a weak voltage value characteristic) 202 of the weak voltage value vlpe in a weak voltage value characteristic storage unit (voltage value characteristic storage unit) 200v, and stores a characteristic (also referred to as a weak voltage integrated value characteristic) 204 of a weak voltage integrated value vilpe which is a position integrated value of the weak voltage value characteristic 202 in a weak voltage integrated value characteristic storage unit (voltage integrated value characteristic storage unit) 200i.

Moreover, instead of storing the weak voltage integrated value vilpe obtained from the weak voltage integrated value characteristic 204 in advance, the weak voltage integrated value vilpe may be generated from the weak voltage value characteristic 202 corresponding to a z-axis height zh at every time that position-based parking is executed.

In this instance, the weak voltage value characteristic 202 and the weak voltage integrated value characteristic 204 are three-dimensional maps of the weak voltage value vlpe and the weak voltage integrated value vilpe, and in such maps, a position xy and the z-axis height zh serve as parameters.

Further, in an induced voltage characteristic storage unit 200e of the storage unit 200, there is stored a vehicle speed induced voltage characteristic 206 defined by a map expressing a correspondence relation among a distance (radial distance) from the power transmitting coil 11, the vehicle speed Vv, and an induced voltage of the power receiving coil 12.

[Operations]

Next, a description will be given concerning the [overall operation] of the above-described embodiment, and respective operations of [first to sixth examples].

[Overall Operation]

At a time of positioning, the driver of the vehicle 20 who is attempting to charge the energy storage device 50 at the charging station 30 of a parking space, at first, prior to the aforementioned pairing, causes the vehicle 20 to travel in a rearward direction (rearward traveling). During such rearward traveling, the vehicle 20 is driven, for example, along a side wall of the parking space, or alternatively, along a side line of a parking frame, and/or while observing an image of the rear camera 71 on the display unit 72, in a manner so that the vehicle body center line 25 of the driver's own vehicle 20 coincides with the x-axis of the power transmission pad 21 of the charging station 30.

It should be noted that, on the x-axis and the y-axis of the power transmission pad 21, white lines may be drawn that are capable of being seen by the driver, or alternatively, by the rear camera 71 or the like.

When the driver has driven the vehicle 20 so as to come in close proximity to the power transmission pad 21, and for example, when the vehicle 20 has come to a position where the power transmission pad 21 overlaps with a bottom surface of a side on the rear portion of the vehicle 20, and where the power transmission pad 21 cannot be identified or confirmed in the image of the rear camera 71, the vehicle 20 is temporarily stopped.

In such a stopped position, the driver presses on a non-contact charging "positioning process" start button, which appears on the touch panel type display unit 72.

The ECU 60 having detected pressing of the "positioning process" start button, performs pairing in order to request, through the communications device 82 and the communications device 81 of the power source ECU 61, that the power source ECU 61 transmit the weak power via a wireless LAN such as WiFi or the like.

When mutual authentication is established by such pairing, the power source ECU 61 of the charging station 30 supplies a constant weak AC current to the power transmitting coil 11 of the power transmission pad 21, and in accordance with the weak current, the constant weak power Plpe is transmitted wirelessly from the power transmission pad 21 (power transmitting coil 11).

On the other hand, if authentication is established, the contactor 46 is placed in a closed state by the ECU 60 of the vehicle 20, whereupon the voltage value detection unit 102 begins to acquire and detect the weak voltage value vlpe through the voltage sensor 52. However, at the point in time when authentication is established, the weak voltage value vlpe lies outside of the detection range of the weak voltage value vlpe, and thus, the weak voltage value vlpe is a zero value and is not detected. Moreover, a noise removal filter may be provided in the voltage sensor 52.

When the accelerator pedal 77 is lightly depressed to cause the motor 80 to rotate and the vehicle 20 starts to travel in a gentle manner, reception of the weak power pipe is initiated at an initial position (which is a known position, as will be described later), and detection (acquisition) of the weak voltage value vlpe, which is a non-zero value, is initiated by the voltage value detection unit 102.

Next, the ECU 60 analyzes the weak voltage value vlpe which is the power reception voltage using the weak voltage value characteristic 202 and the like. From the results of the analysis, the ECU 60 displays on the display unit 72 the position of the power transmitting coil 11 on the side of the charging station 30, and the position (relative position) of the power receiving coil 12 on the side of the vehicle 20 with respect to the position of the power transmitting coil 11, and the like. The driver is notified of such information, which assists the driver in carrying out traveling in order to position the vehicle.

In addition, traveling to perform positioning is continued, and when it is detected that the weak voltage value vlpe has become a known maximum peak value vlpemax, the positioning process is terminated, and driving of the motor 80 of the vehicle 20 is stopped.

At the position where the positioning process is terminated, the ECU 60 of the vehicle 20 issues a notification to the power source ECU 61 of the charging station 30 to the effect that positioning has been completed.

Thereafter, the power source ECU 61 switches the transmission power P1 of the power source unit 31 from the weak power Plpe to the main power Pn, which is a large normal power, and supplies the main power Pn to the power transmitting coil 11 of the power transmission pad 21. Consequently, non-contact charging on the basis of the main power Pn with respect to the energy storage device 50 is carried out through the power receiving coil 12 of the power reception pad 22.

First Example

[Procedure for Detecting Relative Position of Power Receiving Coil 12 with Respect to Power Transmitting Coil 11]

Figure 5:
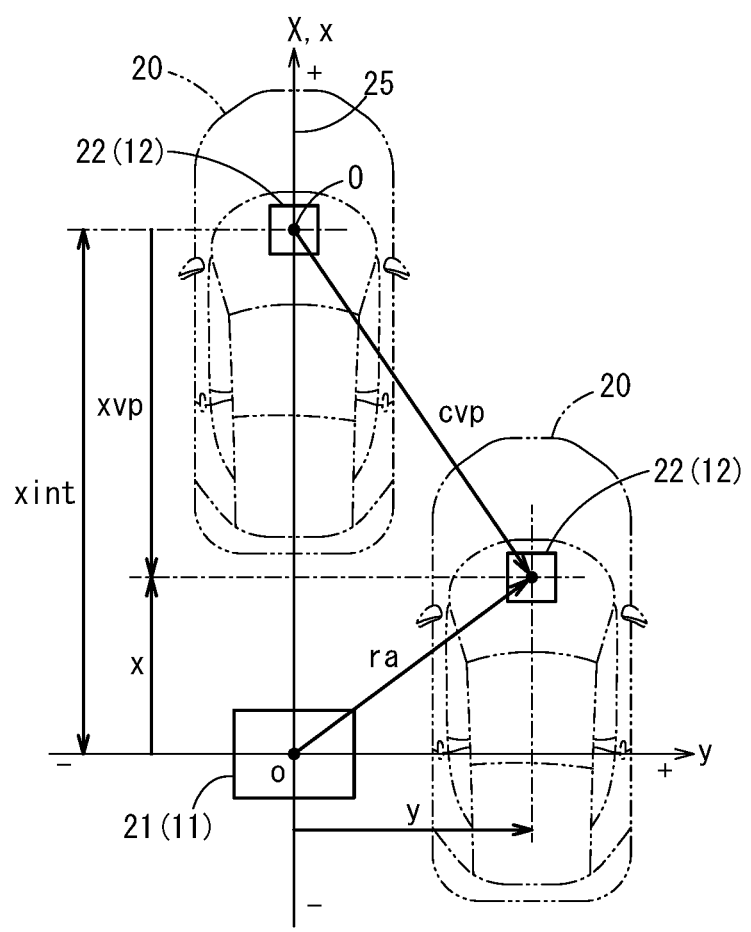
FIG. 5 is a schematic plan view for describing positioning.

FIG. 5 is a schematic plan view in which, concerning the position of the vehicle 20 shown on the upper side in the drawing, a position is shown at which the vehicle 20, which is currently traveling rearward from an upper (positive side) position of the x-axis in the same drawing toward the center o of the power transmission pad 21 (power transmitting coil 11), and while the weak power Plpe is being transmitted from the power transmitting coil 11 after pairing, detects with the voltage value detection unit 102 of the vehicle 20 the weak voltage for the first time through the voltage sensor 52, and the weak voltage value vlpe (vlpe=0+) is detected.

When the weak voltage value vlpe is detected for the first time, the ECU 60 refers to the weak voltage value characteristic 202, and sets the position to an initial position xint {xint=(x, y)=(xint, 0)} of a known distance, and thereafter, begins the positioning process while referring to the weak voltage value characteristic 202. At the same time, the weak voltage integrated value calculation unit 115 begins to calculate the weak voltage integrated value vilpe, which was obtained by position integration of the detected weak voltage value vlpe.

In this instance, at the initial position xint, the vehicle body center line 25 of the vehicle 20 coincides with the x-axis of the power transmitting coil 11.

In actual practice, the distance x between the origin point o of the power transmitting coil 11 and the initial position xint is less than or equal to the vehicle width of the vehicle 20, and the driver is incapable of directly observing the power transmitting coil 11 through the rear camera 71 of the vehicle 20.

In FIG. 5, settings are made so that the x-axis distance in quadrants (positions) above the y-axis is a positive value, and the x-axis distance in quadrants (positions) below the y-axis is a negative value. Further, settings are made so that the y-axis distance y in quadrants (positions) to the right of the x-axis is a positive value, and the y-axis distance y in quadrants (positions) to the left of the x-axis is a negative value. After pairing, and from a position before reaching the initial position xint, for example, the vehicle 20 is traveling rearward for positioning in order to perform parking at a slow constant target vehicle speed Vvtar designated by the ECU 60 or the like, and which is slower than a speed that is slow enough for the vehicle 20 to be stopped immediately.

The vehicle 20 shown on the righthand side in FIG. 5 is a vehicle that is drawn at a current position (current coordinate position, relative radius) ra {ra=(x, y)} of the vehicle 20, which is drawn so that the amount of deviation of the vehicle 20 that is currently traveling rearward for positioning is exaggerated. Moreover, the current position ra(x, y) of the vehicle 20 is the center position (origin point O) of the power reception pad 22 (power receiving coil 12).

In FIG. 5, the displacement of the vehicle from the initial position xint to the current position ra is a vehicle movement amount (also referred to as a movement amount or a movement displacement amount) cvp. Moreover, the vehicle movement amount cvp can be obtained in the movement amount detection unit (also referred to as a movement displacement amount detection unit) 110 from an integral value $\int Vv \cdot dt = cvp$ based on the vehicle speed Vv and a minute time interval dt, and if the vehicle speed Vv is constant, can be obtained by the vehicle speed Vv×a required time interval.

In this instance, the relative movement amount (movement amount, vehicle movement amount, x-axis movement amount) xvp of the power receiving coil 12 on the x-axis from the initial position xint to the current position ra(x, y), for a case in which the vehicle 20 is traveling directly rearward along the x-axis, can be obtained by the following expression (1).

$$xvp = x\text{int} - x \qquad (1)$$

The x-axis position is calculated by the following expression (2), in which expression (1) is modified.

$$x = x\text{int} - xvp \qquad (2)$$

Positioning is completed, for example, when the vehicle 20 travels directly rearward along the x-axis, and in the case that the distance x becomes x=0.

In the first example, the relative movement amount xvp of the x-axis and the x-axis position (distance x) are acquired from the voltage characteristic (weak voltage value characteristic 202) in accordance with the electromagnetic induction of the power receiving coil 12 and the power transmitting coil 11, and the voltage characteristic (weak voltage integrated value characteristic 204) obtained by position integration of the weak voltage value characteristic 202 from the initial position xint up to the center of the power transmitting coil 11 (the coordinate origin point o).

Figure 6:
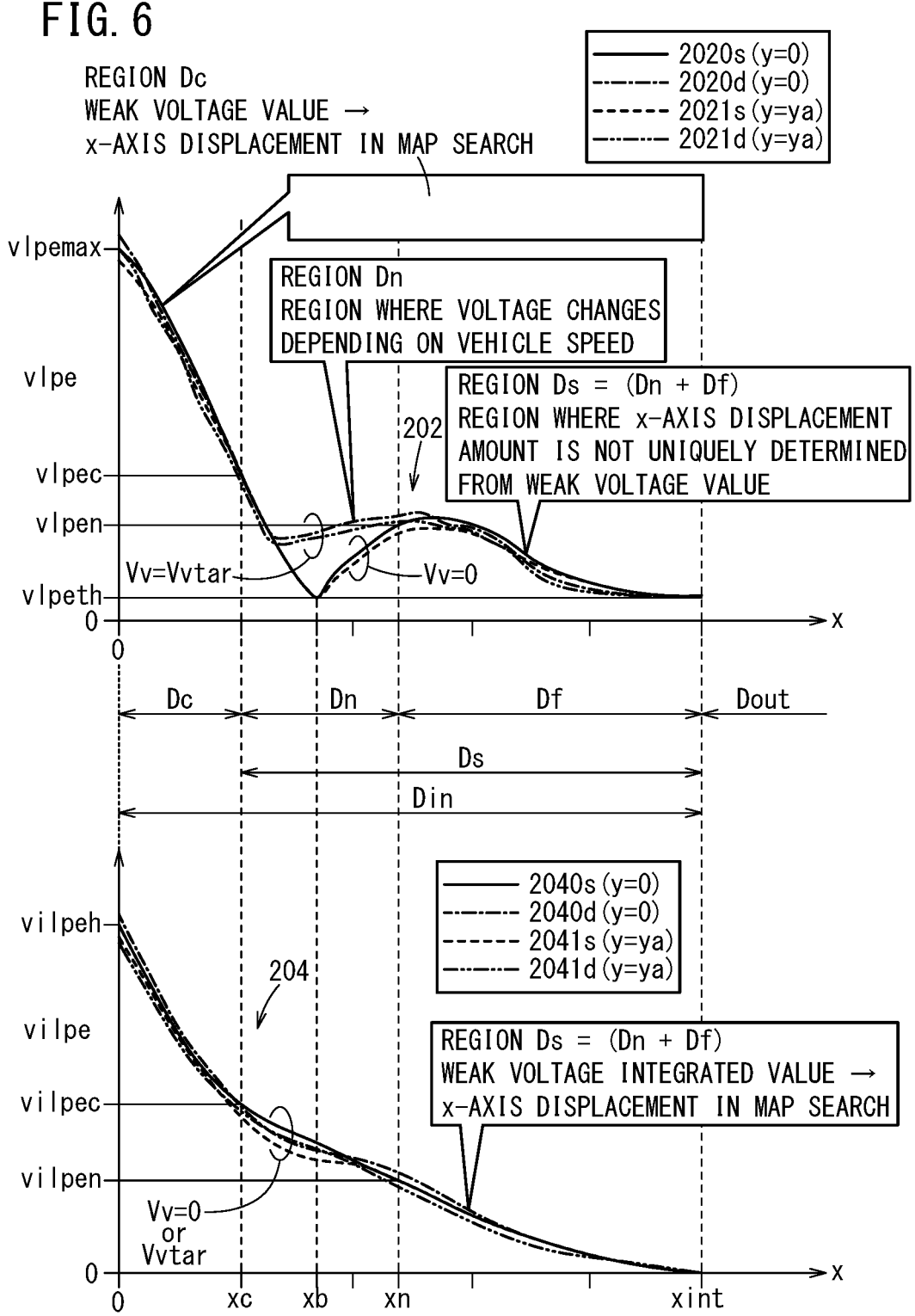
FIG. 6 is a characteristic explanatory diagram of a weak voltage value characteristic and a weak voltage integrated value characteristic.

The graph on the upper side of FIG. 6 shows the weak voltage value characteristic 202 which is stored in advance as a map in the weak voltage value characteristic storage unit 200v, and the graph on the lower side of FIG. 6 shows the weak voltage integrated value characteristic 204 which is stored in advance as a map in the weak voltage integrated value characteristic storage unit 200i.

The weak voltage value characteristic 202 and the weak voltage integrated value characteristic 204 are characteristics for a case in which the difference zh (see FIG. 2) between the height of the power transmitting coil 11 from the ground surface 23 (horizontal plane) on the z-axis, and the height of the power receiving coil 12 from the ground surface 23 (hereinafter also referred to as a z-axis height) is a known height (distance).

In the case that the z-axis height zh differs from the known height, the weak voltage value characteristic 202 and the weak voltage integrated value characteristic 204 can be utilized after height correction has been performed thereon.

Concerning the weak voltage value characteristic 202, the weak voltage value vlpe is shown on the vertical axis, and the distance x from the origin point o on the x-axis (center of the power transmitting coil 11) is shown on the horizontal axis.

Among the weak voltage value characteristics 202, a weak voltage value characteristic 2020s shown by the solid line is a characteristic on the x-axis when the value of the y-axis is y=0 [mm] and the vehicle speed Vv is Vv=0 [mm/s].

The weak voltage value characteristic 2021s shown by the dashed line is a characteristic on the x-axis when the value of the y-axis is y=ya [mm], wherein according to the present embodiment, ya is a value less than on the order of xint/2 (ya<xint/2), and the vehicle speed Vv=0 [mm/s].

The weak voltage value vlpe when the vehicle speed Vv=0 is a static electromotive voltage corresponding to the voltage generated by a magnetic field vibrating at the reference frequency fr, and the value depends on the shape of both coils (the power transmitting coil 11 and the power receiving coil 12). In the present embodiment, as can be understood from the weak voltage value characteristic 2020s at y=0 and the weak voltage value characteristic 2021s at y=ya, the voltage values are substantially equivalent within a distance range of x=0 to xint, even though the value of the y-axis differs (in a range of y=0 to ya).

Figure 3B:
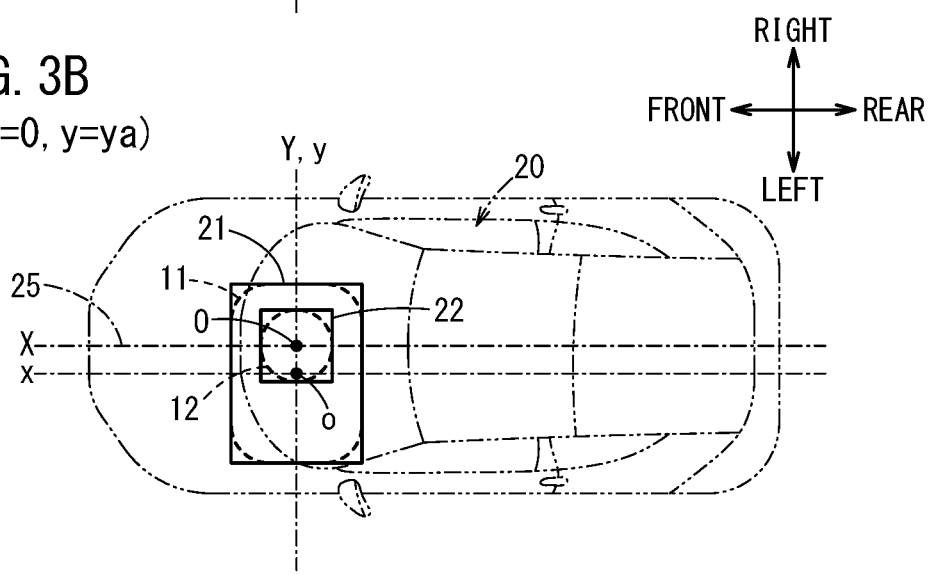
FIG. 3B is a schematic plan view illustrating a state in which the power reception pad is shifted in a y-axis direction.

The reason therefor is that, as shown in FIG. 3B, the power transmitting coil 11 has a shape that approximates a laterally elongate elliptical shape, and in this case, with respect to any deviation in the y-axis direction of the power receiving coil 12 having a circular shape of a smaller area, the decrease in the number of interlinkage fluxes of the power transmitting coil 11 has extremely little influence on the weak voltage value vlpe, and if the deviation in the y-axis direction is less than or equal to a fixed distance ya (y≤ya), there is almost no difference in the weak voltage value vlpe on the y-axis at x=0.

Figure 3C:
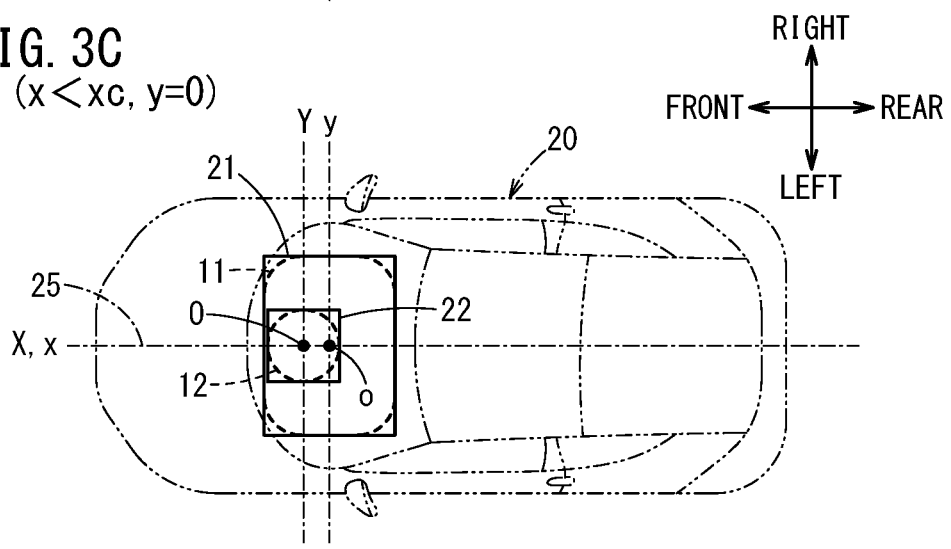
FIG. 3C is a schematic plan view illustrating a state in which the power reception pad lies within a very-close-distance region.

On the other hand, as shown in FIG. 3C, since the power transmitting coil 11 has a shape that approximates a laterally elongate elliptical shape, the decrease in the number of interlinkage fluxes of the power transmitting coil 11 has a large influence on the weak voltage value vlpe, if the power transmitting coil 11 is distanced in the x-direction by greater than or equal to a value of x that satisfies the inequality x>ya.

Thus, in a very-close-distance region Dc that is near to the coordinate origin point o where the distance x is on the order of a very-close-distance threshold position xc, it can be detected that the weak voltage value vlpe is greater than or equal to a weak voltage value (threshold value) vlpec, and therefore, in this case, the relative movement amount xvp on the x-axis (see FIG. 5) can be obtained accurately with high sensitivity by referring to the weak voltage value characteristic 202 using the detected weak voltage value vlpe as an argument.

As described above, among the weak voltage value characteristics 202, the weak voltage value characteristic 2020s shown by the solid line is a characteristic at a time when the value of the y-axis is y=0 [mm] and the vehicle speed Vv is Vv=0 [mm/s].

In contrast thereto, a weak voltage value characteristic 2020d shown by the one-dot-dashed line is a characteristic at a time when the value of the y-axis is y=0 [mm] and the vehicle speed Vv is a target vehicle speed Vvtar of a constant very slow speed (Vv=Vvtar [mm/s]).

Upon comparing the weak voltage value characteristic 2020s when the vehicle speed Vv is Vv=0 (in a stopped state) and the weak voltage value characteristic 2020d when the vehicle speed Vv is the target vehicle speed Vvtar, such a comparison indicates that the very-close-distance region Dc to the very-close-distance threshold position xc in which the distance x from the origin point o is short, and a far-distance region Df from a close-distance threshold position xn to the initial position xint in which the distance x from the origin point o is long both exhibit an approximately monotonically decreasing characteristic. However, a close-distance region Dn from the very-close-distance threshold position xc to the close-distance threshold position xn in which the distance x from the origin point o is medium includes a portion (a portion where both of the characteristics 2020s and 2020d are separated from each other) in which a voltage change occurs depending on the vehicle speed Vv (Vv=0, Vv=Vvtar).

The reason therefor is that a dynamic electromotive voltage (induced voltage) corresponding to the voltage generated in accordance with the law of electromagnetic induction when the power receiving coil 12 itself moves at the vehicle speed Vv=Vvtar is added to the static electromotive voltage (vehicle speed Vv=0) corresponding to the voltage generated by the magnetic field vibrating at the reference frequency fr.

It is understood that the portion (distance) where the voltage change occurs depends on, for example, the coil shapes of the power receiving coil 12 and the power transmitting coil 11.

Thus, according to the present embodiment, the correspondence relation between the vehicle speed Vv and the dynamic electromotive voltage (induced voltage) is stored in advance in the induced voltage characteristic storage unit 200e.

As shown on the upper side in FIG. 6, between the very-close-distance threshold position xc and the close-distance threshold position xn within the weak voltage value characteristic 2020s, etc., the position (point) where the weak voltage value vlpe becomes vlpe=0 (in FIG. 6, the bottom peak value vlpeth to which an offset portion is added) is referred to as a bottom position (bottom distance) xb.

In this manner, the weak voltage value characteristic 202 (in particular, the static weak voltage value characteristic 2020s, etc.) is a characteristic having the following features. Since the distribution of the magnetic field varies depending on the coil shapes or the like, the value of the weak voltage value vlpe corresponding to the amount of weak power transmitted from the center of the power transmitting coil 11 to the entire periphery in a radial direction, which is taken along a cross section in the vertical direction, decreases from the maximum peak value (local maximum value) vlpemax of the power transmitting coil 11 (center of the power transmitting unit) toward the outside in the radial direction, and becomes a bottom peak value (local minimum value) vlpeth (vlpeth≈0), the value increases from the bottom peak value vlpeth further toward the outside in the radial direction and becomes a side peak value (local maximum value) vlpen, and the value decreases from the side peak value vlpen further toward the outside in the radial direction and becomes a zero value at which the weak power Plpe is incapable of being detected.

In this manner, in a separation distance region Ds in which the close-distance region Dn and the far-distance region Df are combined, because a characteristic is exhibited in which the weak voltage value vlpe has unevenness (concavities and convexities) toward the outer side in the radial direction, even though the weak voltage value vlpe is the same, the distance x exists at three locations (three positions), and thus, the distance x and the relative movement amount xvp cannot be uniquely determined on the basis of the weak voltage value vlpe.

On the other hand, as is understood from the weak voltage value characteristic 202, within the very-close-distance region Dc, which is set so that the weak voltage value vlpe becomes greater than or equal to the weak voltage value (threshold value) vlpec that exceeds with a margin the side peak value (local maximum value) Vlpen within the separation distance region Ds, the gradient of the weak voltage value characteristic 202 is steep, and since the distance x is determined uniquely relative to the weak voltage value vlpe, the distance x (relative movement amount xvp) can be measured with high sensitivity (accuracy) using the weak voltage value characteristic 202 having such a steep gradient.

Moreover, at the origin point o where the distance x=0, the weak voltage value vlpe becomes the maximum peak value (local maximum value) vlpemax, and after the vehicle 20 goes past the origin point o, the value of the distance x becomes negative, and the weak voltage value characteristic 202 exhibits a characteristic of being line-symmetrical with respect to the y-axis.

The weak voltage value (side peak value) vlpen which is a local maximum value at x>0 during the middle of positioning, and the weak voltage value (maximum peak value) vlpemax at x=0, respectively, are so-called inflection points. Therefore, the position differential value vdplpe of the weak voltage value vlpe (weak voltage position differential value), which is expressed by the following expression (3) calculated by the position differentiation unit 106p, becomes a zero value (vdplpe=0).

$$vdplpe = d(vlpe)/dx \quad (3)$$

Attention should be paid to the fact that, in the weak voltage value characteristic 2020s, for example, the position differential value vdplpe of the weak voltage value vlpe becomes a zero value also at the bottom position xb.

In order to uniquely determine the distance x and the relative movement amount xvp within the separation distance region Ds, the weak voltage integrated value characteristic 204 shown on the lower side of FIG. 6 is used.

The vertical axis of the weak voltage integrated value characteristic 204 is an integrated value (hereinafter referred to as a weak voltage integrated value vilpe) of the weak voltage value vlpe, which is calculated in advance by the following expression (4) from the weak voltage value characteristic 202, and the horizontal axis is the distance x from the origin point o on the x-axis.

$$vilpe = \int vlpe \cdot dx \quad (4)$$

Among the weak voltage integrated value characteristics 204, the weak voltage integrated value characteristic 2040s shown by the solid line is a characteristic at a time when the value of the y-axis is y=0 [mm] and the vehicle speed Vv is Vv=0 [mm/s].

The weak voltage integrated value characteristic 2041s shown by the dashed line is a characteristic at a time when the value of the y-axis is y=ya [mm] and the vehicle speed Vv is Vv=0 [mm/s].

The weak voltage integrated value characteristic 2040d shown by the one-dot-dashed line is a characteristic at a time when the value of the y-axis is y=0 [mm] and the vehicle speed Vv is Vv=Vvtar [mm/s].

The weak voltage integrated value characteristic 2041d shown by the two-dot-dashed line is a characteristic at a time when the value of the y-axis is y=ya [mm] and the vehicle speed Vv is Vv=Vvr [mm/s] (referred to as a reference vehicle speed).

It is understood that, within the weak voltage integrated value characteristic 204, in the separation distance region Ds in which the close-distance region Dn and the far-distance region Df are combined, the weak voltage integrated value vilpe increases monotonically accompanying an increase in the relative movement amount xvp, and the distance x is uniquely determined in accordance with the weak voltage integrated value vilpe.

At a position on the x-axis of the weak voltage integrated value characteristic 204, the weak voltage integrated value vilpe has the following characteristics. The value thereof at the initial position xint is zero, the value thereof at the close-distance threshold position xn becomes a weak voltage integrated value vilpen (vilpen=∫vlpe·dx, with the integration interval xint ranging from 0 at xint−xn) which is the position integrated value from the initial position xint to the close-distance threshold position xn (the side peak value vlpen) of the weak voltage value characteristic 202, the value thereof at the very-close-distance threshold position xc becomes a weak voltage integrated value vilpec (vilpec=∫vlpe·dx, with the integration interval xint ranging from 0 to xint−xc) which is the position integrated value from the initial position xint to the very-close-distance threshold position xc (weak voltage value vlpec), and at the position of the origin point o (where the distance x is zero), the value thereof becomes a weak voltage integrated value vilpeh (vilpeh=∫vlpe·dx, with the integration interval xint ranging from 0 to xint).

Furthermore, after going past the origin point o, the weak voltage integrated value characteristic 204 becomes an increasing characteristic with point symmetry centered around the weak voltage integrated value vilpeh. Accordingly, within the separation distance region Ds, if the weak voltage integrated value vilpe is less than the weak voltage integrated value vilpec, the distance x is determined to be "positive", whereas if the weak voltage integrated value vilpe is greater than or equal to the weak voltage integrated value vilpec, the distance x is determined to be "negative".

Stated otherwise, depending on whether or not the weak voltage integrated value vilpe is less than the weak voltage integrated value (weak voltage threshold integrated value) vilpec, it can be determined whether the position from the near side to the far side over the origin point o is positive (vilpe<vilpec) or negative (vilpe>vilpec).

Thus, as described in the captioned balloons of FIG. 6, according to the first example, with reference to the weak voltage integrated value characteristic 204 and the weak voltage value characteristic 202, in the case of obtaining the distance x on the x-axis from the origin point o, and more specifically, the position of the power receiving coil 12, or in other words, the relative movement amount xvp on the x-axis from the initial position xint, the detected weak voltage value vlpe and the weak voltage integrated value vilpe which is the position integrated value thereof are obtained for each minute amount of movement dx.

Additionally, in the regions (the close-distance region Dn and the far-distance region Df) from the initial position xint to the very-close-distance threshold position xc in which the relative movement amount xvp on the x-axis is not uniquely determined from the obtained weak voltage value vlpe, the distance x from the origin point o, and more specifically, the relative movement amount xvp on the x-axis from the initial position xint, is obtained using as an argument the obtained weak voltage integrated value vilpe taken with reference to the weak voltage integrated value characteristic 204 in which the relative movement amount xvp is uniquely determined.

On the other hand, in the region (very-close-distance region Dc) from the very-close-distance threshold position xc to the origin point o (distance x=0) in which the relative movement amount xvp on the x-axis from the weak voltage value vlpe is uniquely determined, the distance x from the origin point o, and more specifically, the relative movement amount xvp on the x-axis from the initial position xint, is obtained using as an argument the weak voltage value vlpe taken with reference to the weak voltage value characteristic 202.

[Display of Parking Assistance]

Next, a description will be given concerning an image display on the display unit 72 for the purpose of providing parking assistance for positioning with respect to the driver of the vehicle 20.

In order to carry out positioning of the position of the power receiving coil 12 of the vehicle 20 at the position of the power transmitting coil 11 of the charging station 30, it is preferable to notify the driver of a target accelerator pedal opening (target accelerator opening) θatar corresponding to how strongly the accelerator pedal 77 should be depressed in order to achieve the target vehicle speed Vvtar, and a time period Tp required for positioning which is the time period that the accelerator pedal 77 is to be depressed.

Figure 7:
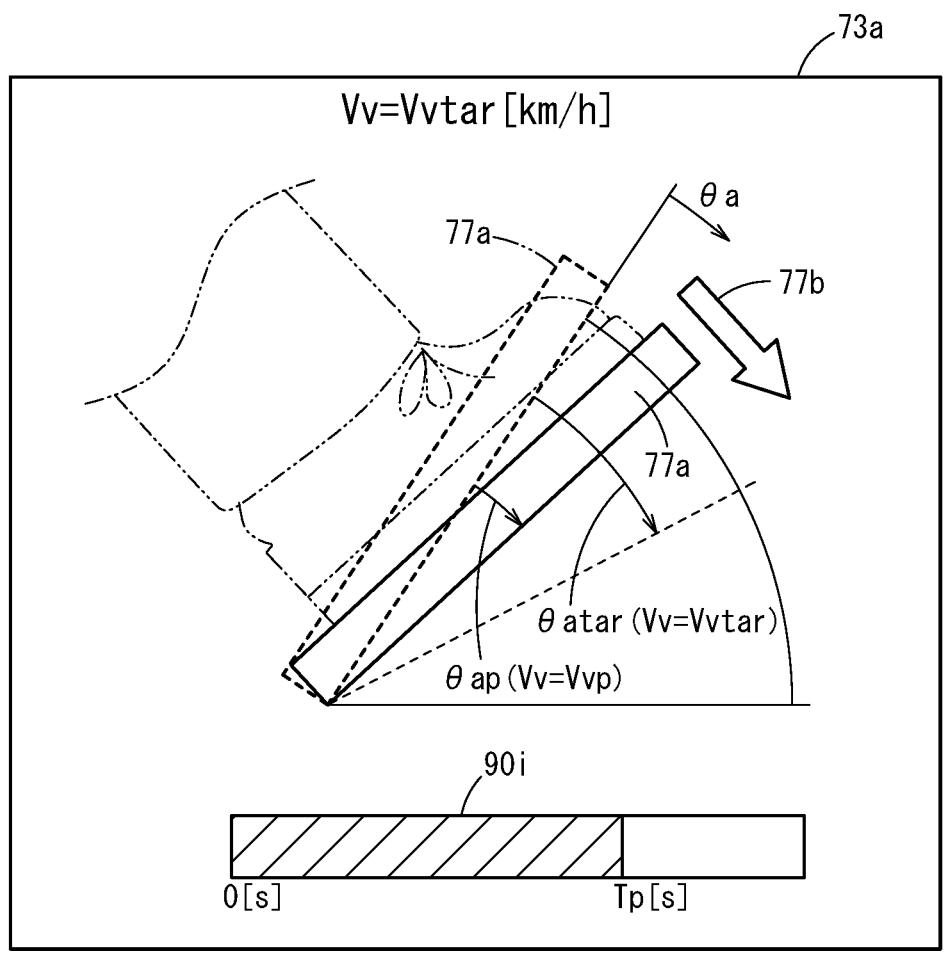
FIG. 7 is an explanatory diagram illustrating an example of an image for parking assistance.

As shown in FIG. 7, the display unit 72 displays a schematic assistance image 73a for positioning which is generated by the image generating unit 119.

In the assistance image 73a, images are displayed including an accelerator pedal image 77a, the accelerator opening (accelerator pedal opening) θap at the current vehicle speed Vvp, the accelerator pedal opening (target accelerator opening) θatar required to achieve the target vehicle speed Vvtar, and an operating direction 77b of the accelerator pedal 77. By the display of such images, a smooth positioning operation with the accelerator pedal 77 by the driver is assisted.

Moreover, the accelerator pedal image 77a that is drawn with the dashed line shows the original position of the accelerator pedal 77, and the accelerator pedal image 77a that is drawn with the solid line shows the current position of the accelerator pedal 77.

Furthermore, in the assistance image 73a, a gauge image 90i shows the time period Tp required for positioning, in order to provide a notification of how many seconds it will take to reach the origin point o which is the target position, in the case that the current accelerator opening θap continues to be depressed.

In this manner, a target vehicle speed Vvtar [km/m] that is optimal for smooth parking is defined, and is used to set the target accelerator opening θatar. A notification can be provided to the driver, so that the driver can visually and easily recognize the current accelerator opening θap and the target accelerator opening θatar.

Figure 8:
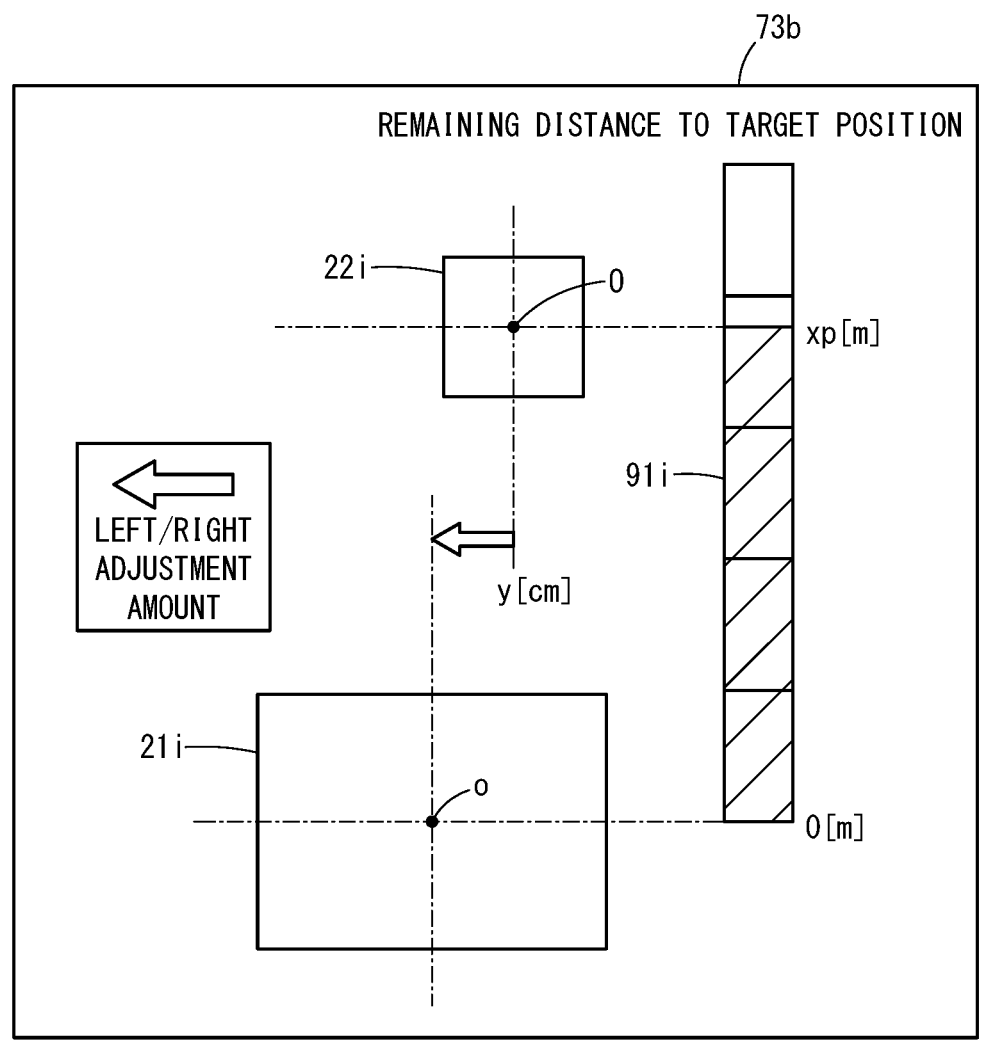
FIG. 8 is an explanatory diagram illustrating another example of an image for parking assistance.

In FIG. 8, another schematic assistance image 73b for positioning is displayed which is generated by the image generating unit 119.

In the assistance image 73b, there are displayed the current position of a power reception pad image 22i shown with reference to the position of a power transmission pad image 21i, a left/right adjustment amount of the steering wheel, and a gauge image 91i that provides a notification of a remaining distance xp from the current position to the origin point o which is the target position.

By displaying the assistance images 73a and 73b for positioning in this manner, without skill or experience, the driver can park the vehicle 20 at an appropriately (accurately) aligned position (a position where the origin point o and the origin point O coincide with each other as viewed in plan).

In this manner, according to the first example, the distance x, which is the relative position of the power receiving coil 12 from the coordinate origin point o of the x-axis of the power transmitting coil 11, can be estimated (acquired) from the weak voltage value vlpe in accordance with the electromagnetic induction of the power receiving coil 12 and the power transmitting coil 11, and the weak voltage integrated value vilpe corresponding to the movement displacement amount of the power receiving coil 12.

In this case, in the very-close-distance region Dc where the distance x is uniquely determined, the distance x is calculated from the weak voltage value vlpe, with reference to the weak voltage value characteristic 202 which is set corresponding to the known z-axis height zh.

In this case, the positive or negative determination of the x-axis within the close distance area Dc is determined from the slope of a weak voltage position differential value vdplpe indicated by equation (3), and the shift position Sp.

Further, whether or not the very-close-distance region Dc has been entered from the close-distance region Dn is determined in accordance with whether the weak voltage value vlpe has exceeded the weak voltage value vlpec, or whether the weak voltage integrated value vilpe has exceeded the weak voltage integrated value vilpc at the same position as the weak voltage value vlpec.

The positive or negative determination of the x-axis within the separation distance region Ds is determined from the shift position Sp, and the slope of a position differential value (position differential value of the weak voltage integrated value) vdpilpe of the weak voltage integrated value vilpe, which is calculated by the following expression (5).

$$vdpilpe = d(vilpe)/dx \qquad (5)$$

Within the separation distance region Ds where the distance x is not uniquely determined from the weak voltage value characteristic 202, the distance x is calculated from the weak voltage integrated value characteristic 204 which uniquely determines the distance x.

Moreover, the current position (radial distance) ra(x, y) of the vehicle 20 may be obtained without using the weak voltage integrated value characteristic 204, but rather simply from the initial position xint when the vehicle 20 has entered the interior of the far-distance region Df of a weak voltage detection range interior region (referred to as a weak voltage detection range interior region or a detection range interior region) Din from the exterior of the weak voltage detection range (referred to as a weak voltage detection range exterior region or a detection range exterior region) Dout (see FIG. 6), and the vehicle movement amount cvp (see FIG. 5) which is calculated on the basis of the vehicle speed Vv from the vehicle speed sensor 74 and the steering angle θs from the steering angle sensor 78.

Furthermore, within the close-distance region Dn, an induced voltage corresponding to the relative movement speed between the power receiving coil 12 and the power transmitting coil 11 is generated, and therefore, with reference to the vehicle speed induced voltage characteristic 206, which is a map of the characteristic corresponding to the induced voltage that is obtained in advance from the vehicle speed Vv, the weak voltage value vlpe in which any offset of the weak voltage value vlpe is corrected is obtained. Further, concerning the weak voltage integrated value vilpe, a value obtained by integrating the corrected weak voltage value vlpe is used.

Further, since the weak voltage value characteristic 202 changes depending on the z-axis height zh which forms a gap between the power receiving coil 12 and the power transmitting coil 11, the weak voltage value characteristic 202 is either selected or corrected in consideration of the z-axis height zh.

Further still, concerning the weak voltage integrated value vilpe, in order to avoid the integration also of errors therein, in the case that the vehicle speed Vv=0 in which case an induced voltage is not generated, then on the basis of the current weak voltage value vlpe and the weak voltage integrated value vilpe, the weak voltage integrated value vilpe is reset to a value, and more specifically a reference value, on the weak voltage integrated value characteristic 204 with respect to the weak voltage value vlpe for which the vehicle speed Vv is Vv=0.

In this case, each of the regions of the very-close-distance region Dc, the close-distance region Dn, and the far-distance region Df is determined from the current weak voltage integrated value vilpe, and for each of such regions, the value on the weak voltage integrated value characteristic 204 corresponding to the value of the weak voltage value vlpe, that is, the reference value, may be assigned and reset as the weak voltage integrated value vilpe after having been reset.

Second Example

[Identification and Determination of Weak Voltage Detection Range Exterior Region Dout and Weak Voltage Detection Range Interior Region Din]

As described above, according to the present embodiment, basically, the movement amount xvp of the power receiving coil 12 on the x-axis from the initial position xint where the weak voltage value vlpe is initially received, or stated otherwise, the x-axis position (distance) x from the origin point o of the power transmitting coil 11 is calculated.

Therefore, in the detection range exterior region Dout, parameters such as the weak voltage integrated value vilpe and the x-axis movement amount xvp are reset, and if the vehicle 20 enters the detection range interior region Din (when entering from outside of the detection range to the interior of the detection range), by resetting the parameters such as the weak voltage integrated value vilpe and the x-axis movement amount xvp, initialization is carried out to set the initial position xint, together with starting calculation of the weak voltage integrated value vilpe and the x-axis movement amount xvp.

Although within the detection range exterior region Dout, the weak voltage value vlpe remains at the lower limit value (a small amount of random noise and an offset are mixed therein), even within the detection range interior region Din, the weak voltage value vlpe becomes the lower limit value at the bottom position xb, and therefore, the weak voltage detection range interior or exterior region cannot be determined accurately using only the weak voltage value vlpe.

In the detection range interior region Din, the weak voltage value vlpe exceeds zero except at the bottom position xb, and therefore, a voltage slightly in excess of zero, i.e., a voltage approximately corresponding to the aforementioned bottom peak value vlpeth, is set as a weak voltage threshold value {because the value thereof is substantially the same, it is referred to as the weak voltage threshold value vlpeth with the same reference characters (see FIG. 6)}.

Thus, if the weak voltage value vlpe is greater than or equal to the weak voltage threshold value vlpeth, the region is determined to be the detection range interior region Din. It should be noted that, since the noise is removed by a filtering process and the offset portion is removed, the weak voltage threshold value vlpeth is set to a 0+ value (a positive value close to zero).

Further, in the case that the weak voltage value vlpe is less than or equal to the weak voltage threshold value vlpeth and the vehicle is in the stopped state (Vv=0), it cannot be determined whether the position lies within the detection range exterior region Dout or is the bottom position xb. Therefore, the parameter values (the weak voltage integrated value vilpe, etc.) that were previously detected are maintained without being reset.

Furthermore, if the weak voltage value vlpe is less than or equal to the weak voltage threshold value vlpeth and the vehicle is currently traveling (Vv ≠ 0), and if a time period during which a time differential value vdtlpe of the weak voltage value vlpe as expressed by the following expression (6) is zero has continued for a threshold time period Tth, then the region is determined to be the detection range exterior region Dout, and the parameters are reset.

$$vdtlpe = d(vlpe)/dt \qquad (6)$$

In this instance, the time differential value vdtlpe is calculated by a time differentiation unit 106t as a minute amount of change d(vlpe) of the weak voltage value vlpe with respect to an amount of change of the minute time interval dt as measured by a non-illustrated timer (clocking unit).

Further still, if the weak voltage value vlpe is less than or equal to the weak voltage threshold value vlpeth and the vehicle is currently traveling (Vv ≠ 0), and if the weak voltage time differential value vdtlpe undergoes a change to vdtlpe ≠ 0, the region is determined to be the detection range interior region Din.

Furthermore, the x-axis position x may be calculated from the initial position xint when the detection range interior region Din has been entered from the detection range exterior region Dout, and the vehicle movement amount cvp calculated from the vehicle speed sensor 74 and the steering angle sensor 78, and whether the x position is positive or negative may be determined based on the calculated x-axis position.

Third Example

[Procedure for Calculating x-Axis Movement Amount Xvp]

Figure 9:
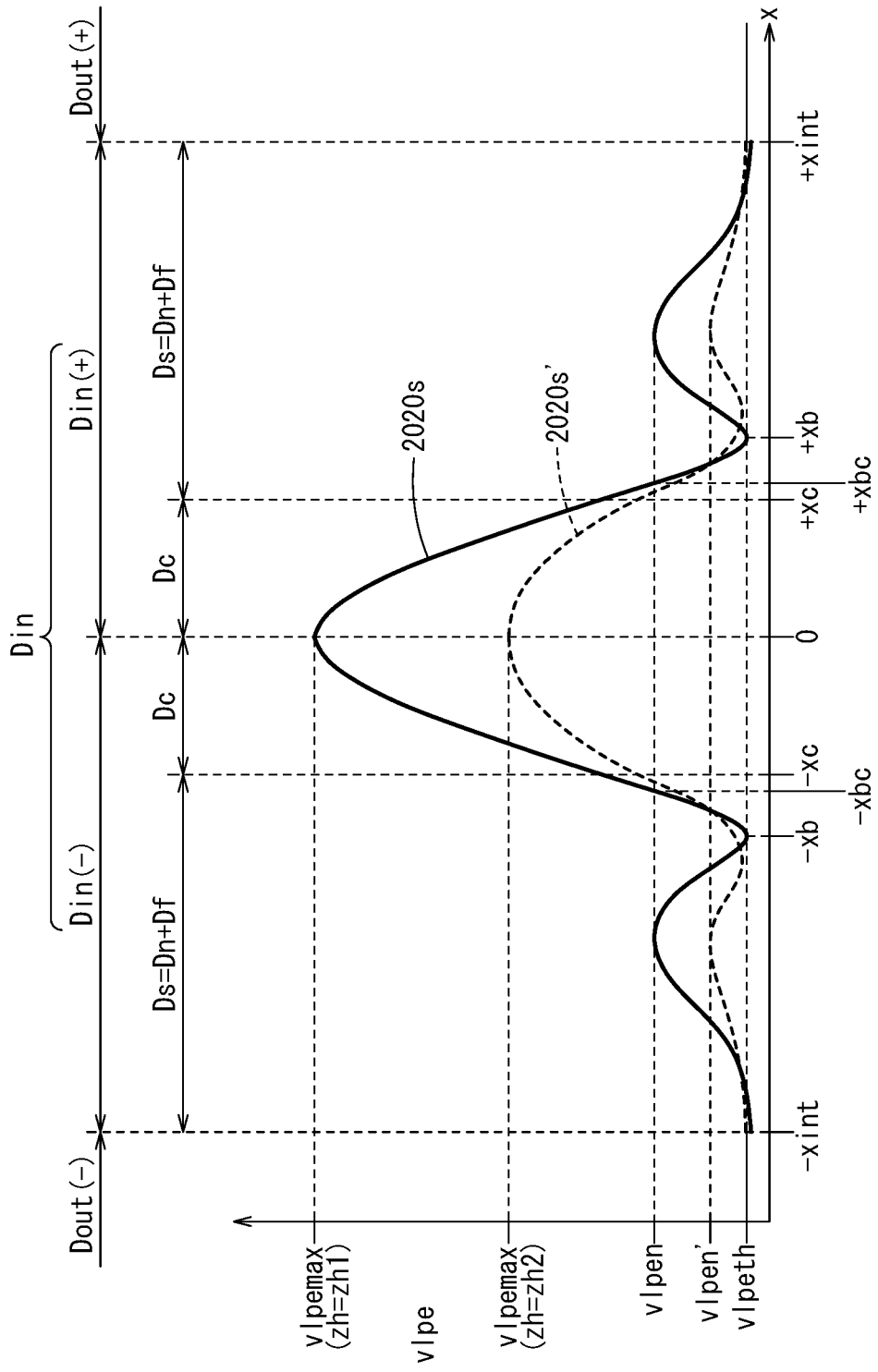
FIG. 9 is a characteristic explanatory diagram in which the weak voltage value characteristic is drawn to both positive and negative sides of an origin.

In FIG. 9, there is shown the weak voltage value characteristic 2020s (at which the z-axis height zh is zh1) and a weak voltage value characteristic 2020s' (at which the z-axis height zh is zh2, zh2>zh1), which are drawn on both positive and negative sides of the origin point o of the x-axis.

The weak voltage value characteristic 2020s' is the characteristic occurring at a time when the z-axis height is zh=zh2, which is higher than the z-axis height of zh=zh1, and the weak voltage value vlpe is a low value within the entire detection range interior region Din.

For example, when the vehicle 20 enters the detection range interior region Din(+) from the detection range exterior region Dout(+), the weak voltage position differential value vdplpe as indicated by the expression (3) transitions from a zero value (vdplpe=0) to a non-zero value (vdplpe #0).

Figure 10A:
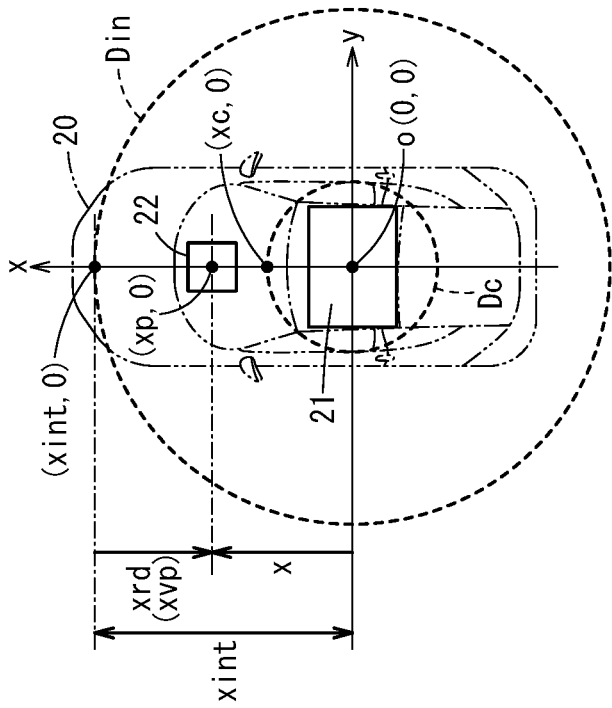
FIG. 10A is a schematic plan view illustrating the vehicle in an initial position.

As shown in FIG. 10A, the position where the weak voltage position differential value vdplpe has transitioned from the zero value to the non-zero value is set to the initial position xint.

Figure 10B:
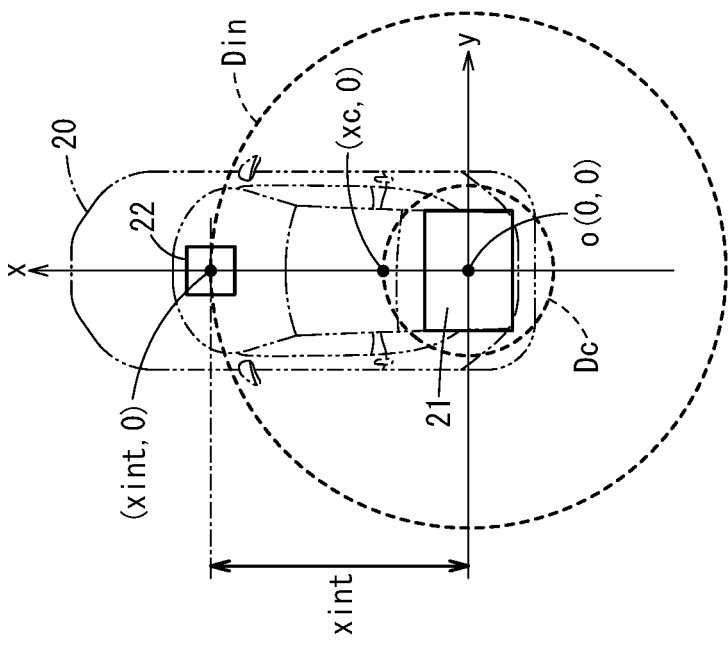
FIG. 10B is a schematic plan view illustrating the vehicle at a position during the middle of a positioning process.

As shown in FIG. 10B, the x-axis position (distance x) can be obtained by subtracting the movement amount xvp from the initial position xint (xint, 0). Moreover, according to the third example, it is assumed that the y-axis movement amount is very small to such an extent that it can be ignored.

According to the third example, the x-axis movement amount xvp is calculated by $\int Vv \cdot dx$ or by a vehicle speed Vv×a required time interval, for example, Vvtar×a required time interval, from the initial position xint (xint, 0) up to the very-close-distance threshold position+xbc or a very-close-distance threshold position xc (xc, 0) having a small margin relative to the very-close-distance threshold position+xbc where the weak voltage value vlpe becomes the side peak value (vlpen) for a second time. In addition, the x-axis movement amount xvp is calculated with reference to the weak voltage value characteristic 2020 (2020s or 2020s') of the very-close-distance region Dc, from the very-close-distance threshold position xc (xc, 0) or the position (very-close-distance threshold position+xbc) where the weak voltage value vlpe becomes the side peak value (vlpen) for a second time up to the origin point o (0, 0).

Consequently, the power receiving coil 12 of the vehicle 20 can be positioned reliably and with a simple structure from the initial position of the weak power (initial detected position)+xint up to a position (maximum peak value detected position) at the maximum peak value vlpemax.

Moreover, in FIG. 9, the other side peak value vlpen' indicates the side peak value of the weak voltage value characteristic 2020s'.

Fourth Example

[Outline of Positive or Negative Determination of x-Axis]

Although the details thereof will be described below with reference to the later-described flowcharts (step S3 of FIG. 14, and FIG. 17), a relative front or rear position (positive or negative position) of the power receiving coil 12 with respect to the power transmitting coil 11 is estimated on the basis of the shift position Sp, the weak voltage value vlpe, the weak voltage integrated value vilpe with respect to vehicle displacement, and the weak voltage position differential value vdplpe with respect to vehicle displacement.

Further, whether the value is positive or negative at the initial position xint is determined from the shift position Sp at the time that the vehicle 20 enters the detection range interior region Din from the detection range exterior region Dout.

Within the close-distance region Dn and the far-distance region Df, whether the value of the x-axis is positive or negative is determined from the weak voltage integrated value vilpe.

Within the very-close-distance region Dc, it is estimated whether the power receiving coil 12 is in close proximity to or is separated away from the power transmitting coil 11 depending on whether the differential value of the weak voltage value vlpe with respect to vehicle displacement, i.e., the weak voltage position deferential value vdplpe, is positive or negative. In addition, whether the x-axis position is positive or negative is determined by determining whether the vehicle 20 is moving forward or rearward on the basis of the shift position Sp.

Fifth Example

[Estimation of y-Axis Movement Amount]

Figure 11:
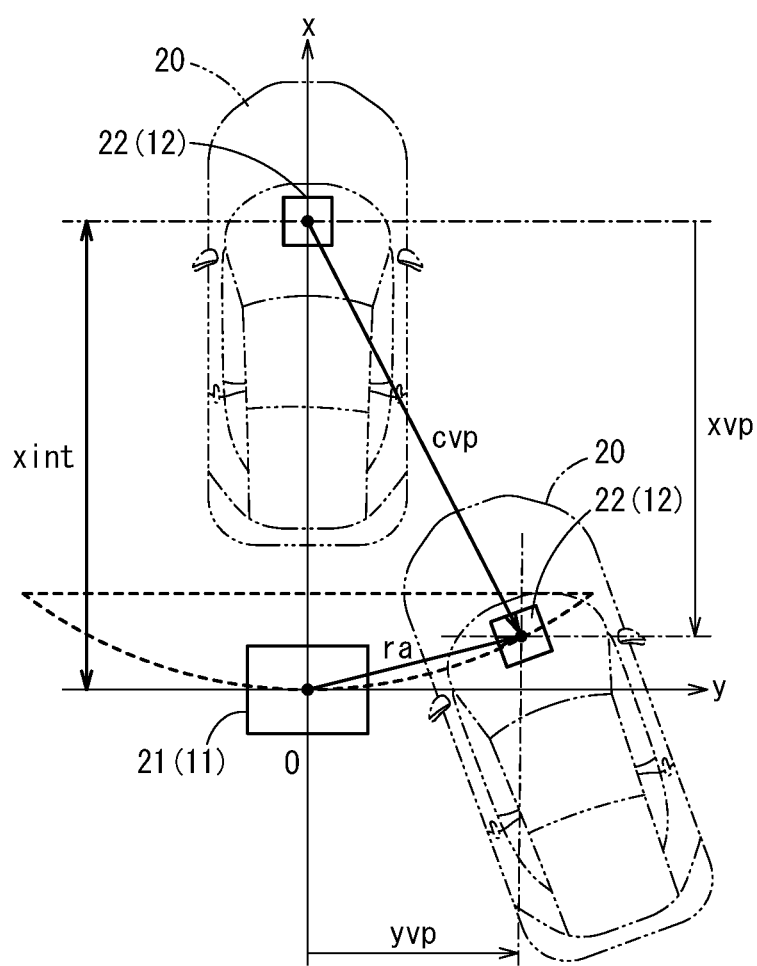
FIG. 11 is a schematic plan view for describing a process of estimating a y-axis movement amount from a vehicle movement amount.
Figure 12:
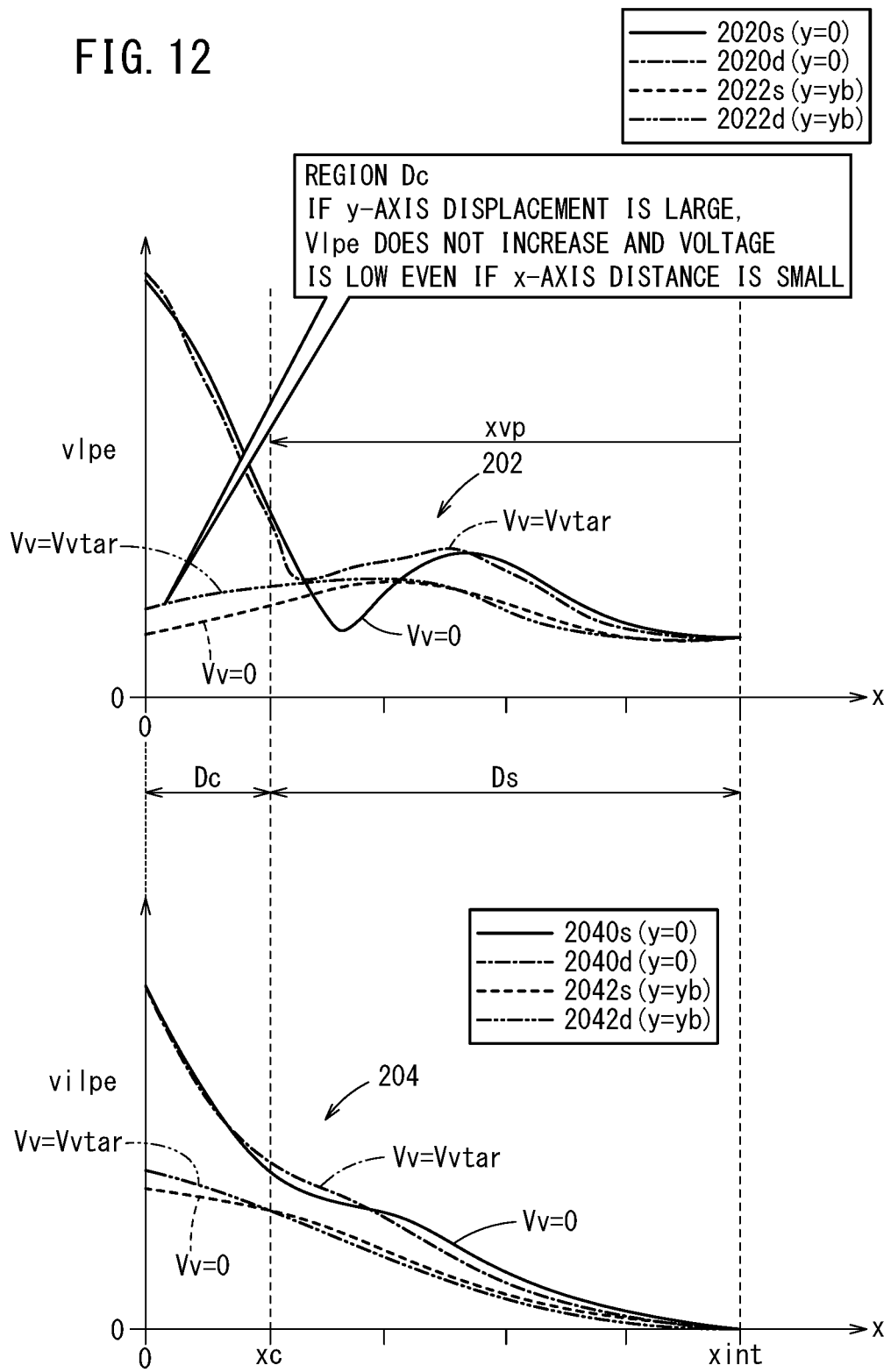
FIG. 12 is a characteristic explanatory diagram for describing a process of estimating the y-axis movement amount from the vehicle movement amount.

For a case in which the vehicle 20 is presumed to be positioned inside the very-close-distance region Dc on the basis of the vehicle movement amount xvp shown in FIG. 11 and the weak voltage value vlpe shown in FIG. 12, the distance in the y-axis direction (y-axis movement amount) yvp is estimated.

In FIG. 12, among the weak voltage value characteristics 202, the weak voltage value characteristic 2020s shown by the solid line is a characteristic on the x-axis when the value of the y-axis is y=0 [mm] and the vehicle speed Vv is Vv=0 [mm/s].

The weak voltage value characteristic 2022s shown by the dashed line is a characteristic on the x-axis at a time when the value of the y-axis is y=yb (yb>ya) [mm] and the vehicle speed Vv is Vv=0 [mm/s].

The weak voltage value characteristic 2020d shown by the one-dot-dashed line is a characteristic at a time when the value of the y-axis is y=0 [mm] and the vehicle speed Vv is a target vehicle speed Vvtar of a constant very slow speed (Vv=Vvtar [mm/s]).

The weak voltage value characteristic 2022d shown by the two-dot-dashed line is a characteristic on the x-axis at a time when the value of the y-axis is y=yb [mm] and the vehicle speed Vv is a target vehicle speed Vvtar of a constant very slow speed (Vv=Vvtar [mm/s]).

The characteristics 2040s, 2040d, 2042s, and 2042d are weak voltage integrated value characteristics that correspond respectively to the characteristics 2020s, 2020d, 2022s, and 2022d.

For a case in which the vehicle 20 is presumed to be positioned inside the very-close-distance region Dc, if the displacement of the y-axis direction is less than or equal to ya, the weak voltage value vlpe increases as the x-axis movement amount xvp increases. However, if the deviation in the y-axis direction is large, for example in the case that y=yb>ya, the weak voltage value vlpe becomes smaller as the x-axis movement amount xvp increases.

Accordingly, the y-axis movement amount yvp is obtained from the x-axis movement amount xvp shown in FIG. 11, for example, xvp=vehicle speed Vv×a required time interval, and the characteristics 202 and 204 shown in FIG. 12. Moreover, whether the y-axis movement amount yvp is positive or negative can be determined from the steering angle θs of the vehicle 20.

Sixth Example

[Procedure for Obtaining x-Axis Position x and y-Axis Position y]

Figure 13:
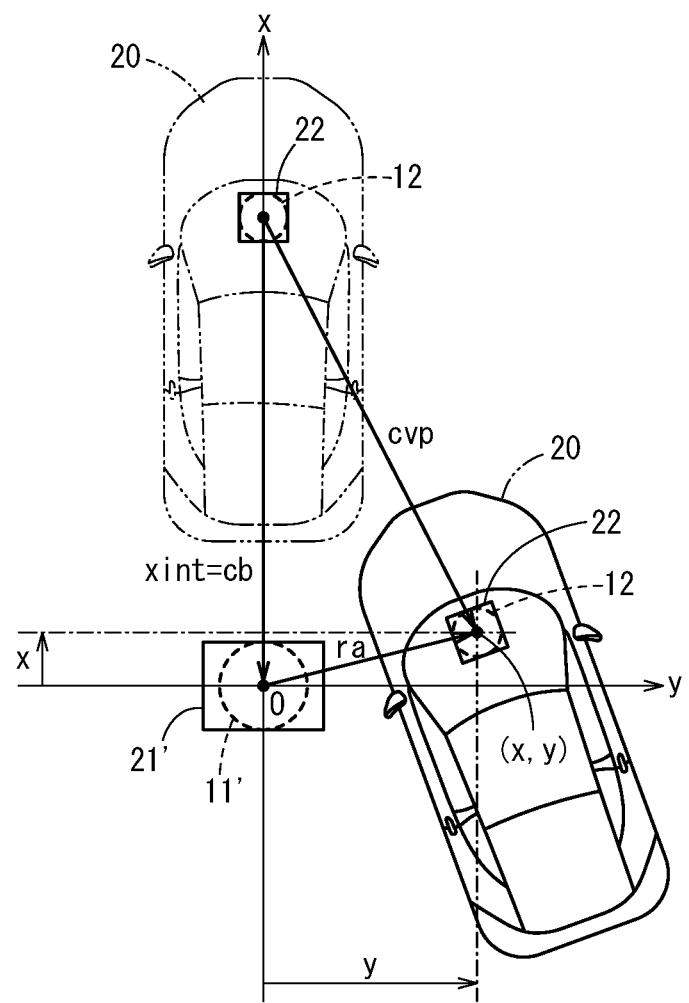
FIG. 13 is an explanatory view for obtaining position coordinates of the vehicle by a numerical formula.

As shown in FIG. 13, assuming that the power transmitting coil in a power transmission pad 21' is a power transmitting coil 11' having a circular shape, in the case that a current coordinate position ra(x, y) is obtained, the vehicle movement amount cvp is calculated from the vehicle speed Vv as indicated by the following expression (7).

$$cvp = \int Vv \cdot dt \quad (7)$$

The following expressions (8) and (9) can be obtained from the Pythagorean theorem.

$$y^2 + x^2 = ra^2 \quad (8)$$

$$y^2 + (cb-x)^2 = cvp^2 \quad (9)$$

In this instance, ra is the magnitude of a vector obtained with reference to the weak voltage value characteristic 202 from the weak voltage value vlpe, for a case in which y satisfies the inequality y<ya. The value of cb is equivalent to the initial position (initial distance) xint.

By solving the expressions (8) and (9) with respect to x and y, the following expressions (10) and (11) are obtained, and in accordance with such expressions, the current coordinate position (radius) ra(y, x) can be obtained.

$$x = (ra^2 - cvp^2 + cb^2)/2 \cdot cb \quad (10)$$

$$y = \{(ra+cb+cvp)(ra-cb+cvp)(ra+cb+cvp)(-ra+cb+cvp)\}^{1/2}/2cb \quad (11)$$

[Description of Operations in Accordance with Flowcharts]

Next, with reference to the flowcharts, a description will be given concerning the positioning process of the power reception pad (power receiving coil 12) of the vehicle 20 with respect to the power transmission pad 21 (power transmitting coil 11) of the charging station 30, or stated otherwise, a detection process (calculation process) of detecting the relative position of the power receiving coil 12 with respect to the power transmitting coil 11.

Figure 14:
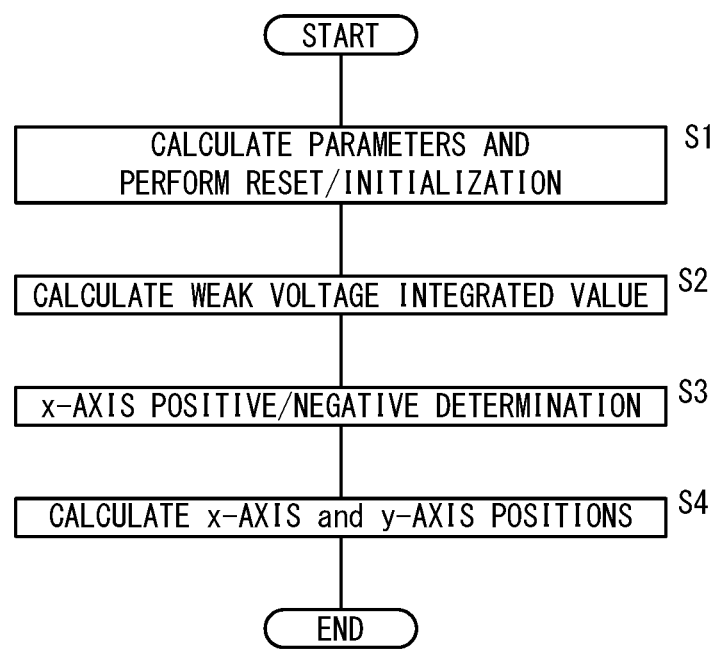
FIG. 14 is an overall flowchart of a relative position detection process.

FIG. 14 is an overall flowchart of a relative position detection process. It should be noted that, in order to avoid complexity, descriptions of the ECU 60 which executes the programs in accordance with the flowcharts have been omitted in part. Further, the overall flowchart is repeatedly executed at a minute time interval, for example, the aforementioned minute time interval dt.

In step S1, the ECU 60 performs parameter calculations, a resetting process for the calculated parameters, and an initializing process.

The parameters are basically the movement amount cvp of the vehicle 20 and the weak voltage integrated value vilpe. In the case that the y-axis movement amount is very small to such a degree that it can be ignored, the movement amount cvp may be taken as the x-axis relative movement amount (x-axis movement amount) xvp. In the initializing process, an initializing process of the current position ra(x, y), and more specifically, a process to satisfy the equality cvp(x, y)=xint(xint, 0), is performed.

In step S2 after completion of the resetting and initializing processes, the ECU 60 performs a calculation process to calculate the weak voltage integrated value vilpe from the detected weak voltage value vlpe.

Next, in step S3, it is determined whether the x-axis is positive or negative.

Furthermore, in step S4, on the basis of the weak voltage value vlpe and the weak voltage integrated value vilpe, the detection process (calculation process) is performed. The detection process (calculation process) detects the relative position of the power reception pad (power receiving coil 12) as the power reception unit of the vehicle 20 with respect to the power transmission pad 21 (power transmitting coil 11) as the power transmission unit of the charging station 30.

Figure 15:
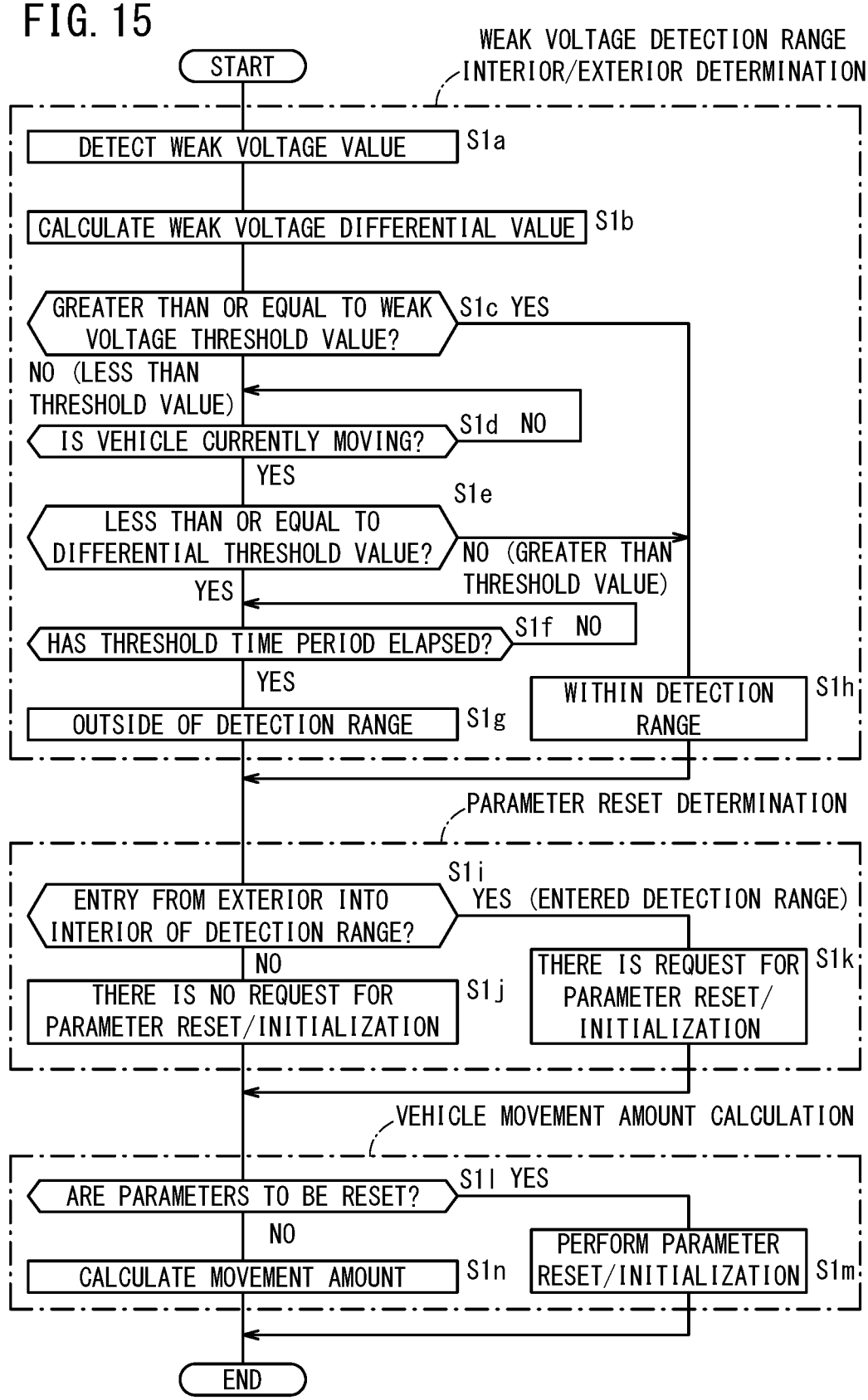
FIG. 15 is a detailed flowchart for describing calculation of the vehicle movement amount as a parameter, and a reset process and initializing process of the vehicle movement amount and the weak voltage integrated value.

FIG. 15 is a detailed flowchart of the process of step S1 for describing calculation of the vehicle movement amount cvp as a parameter, and a reset process and initializing process of the vehicle movement amount cvp and the weak voltage integrated value vilpe.

In step S1a, the voltage value detection unit 102 of the ECU 60 (see FIG. 4) detects the weak voltage value vlpe through the voltage sensor 52. Moreover, when the weak voltage value vlpe is detected, a filtering process is performed in order to remove noise and to detect and remove an offset and the like.

Next, in step S1b, the position differentiation unit 106p and the time differentiation unit 106t of the differentiation unit 106, respectively, calculate the position differential value vdplpe and the time differential value vdtlpe of the weak voltage value vlpe.

Next, in step S1c, the significance determination unit 104 determines whether the detected weak voltage value vlpe is a value greater than or equal to the weak voltage threshold value vlpeth.

In the initial determination, since the vehicle 20 lies within the detection range exterior region Dout, the weak voltage value vlpe is less than the weak voltage threshold value vlpeth, and the determination is negative (step S1c: NO).

Next, in step S1d, the ECU 60 detects the vehicle speed Vv through the vehicle speed sensor 74 and determines whether or not the vehicle 20 is currently moving (is currently being displaced). In the case that the vehicle 20 is currently moving, then in step S1e, the ECU 60 determines whether or not the position differential value vdplpe and/or the time differential value vdtlpe is less than or equal to threshold values (position differential threshold value dpth, time differential threshold value dtth), as expressed by the following expressions (12) and (13).

$$vdplpe \leq dpth \quad (12)$$

$$vdtlpe \leq dtth \quad (13)$$

In step S1e, in the case at least one of the determinations is positive (step S1e: YES), then in step S1f, a determination is made as to whether or not the threshold time Tth of the minute time interval has passed. If the threshold time interval Tth has passed (step S1f: YES), then in step S1g, the detection range interior/exterior determination unit 108 determines that the power receiving coil 12 of the vehicle 20 lies within the detection range exterior region Dout (outside of the detection range).

On the other hand, in the case that the weak voltage value vlpe is greater than or equal to the weak voltage threshold value vlpeth in the determination of the aforementioned step S1c (step S1c: YES), and in the case that at least one of the differential values exceeds the threshold value in the determination of step S1e (step S1e: NO), then in step S1h, the detection range interior/exterior determination unit 108 determines that the power receiving coil 12 of the vehicle 20 lies within the detection range interior region Din (inside the detection range).

Next, in step S1i, the initial position/parameter setting unit 112 determines whether or not the power receiving coil 12 of the vehicle 20 has entered (transitioned to) the detection range interior region Din from the detection range exterior region Dout.

In the case that the entry (transition) does not occur (step S1i: NO), or stated otherwise, in the case of continuing to reside within the detection range exterior region Dout or continuing to reside within the detection range interior region Din, then in step S1j, the initial position/parameter setting unit 112 determines that a parameter resetting request has not been made.

On the other hand, in the case that the entry (transition) does occur (step S1i: YES), or stated otherwise, in a case that the power receiving coil 12 of the vehicle 20 enters (transitions to) the detection range interior region Din from the detection range exterior region Dout, then in step S1k, the initial position/parameter setting unit 112 determines that a parameter resetting request and an initialization request have been made.

Next, in step S1l, in the case that the parameter resetting request and the initialization request have been made (step S1l: YES), then in step S1m, the initial position/parameter setting unit 112 resets the weak voltage integrated value vilpe to a zero value, and carries out the initializing process to set the movement amount cvp to the initial position xint (xint, 0).

In step S1l, in the case that the parameter resetting request and the initialization request have not been made (step S1l: NO), then in step S1n, based on the premise of traveling at a very slow speed, the movement amount detection unit 110 obtains an X-axis movement amount component and a Y-axis movement amount component of the movement amount cvp of the vehicle 20 on the basis of, for example, the vehicle speed Vv, various vehicle factors such as a wheel base length and the like, and the steering angle θs.

Moreover, the movement amount cvp can also be obtained using a positioning device such as a GPS device or the like, or by using inertial navigation.

Figure 16:
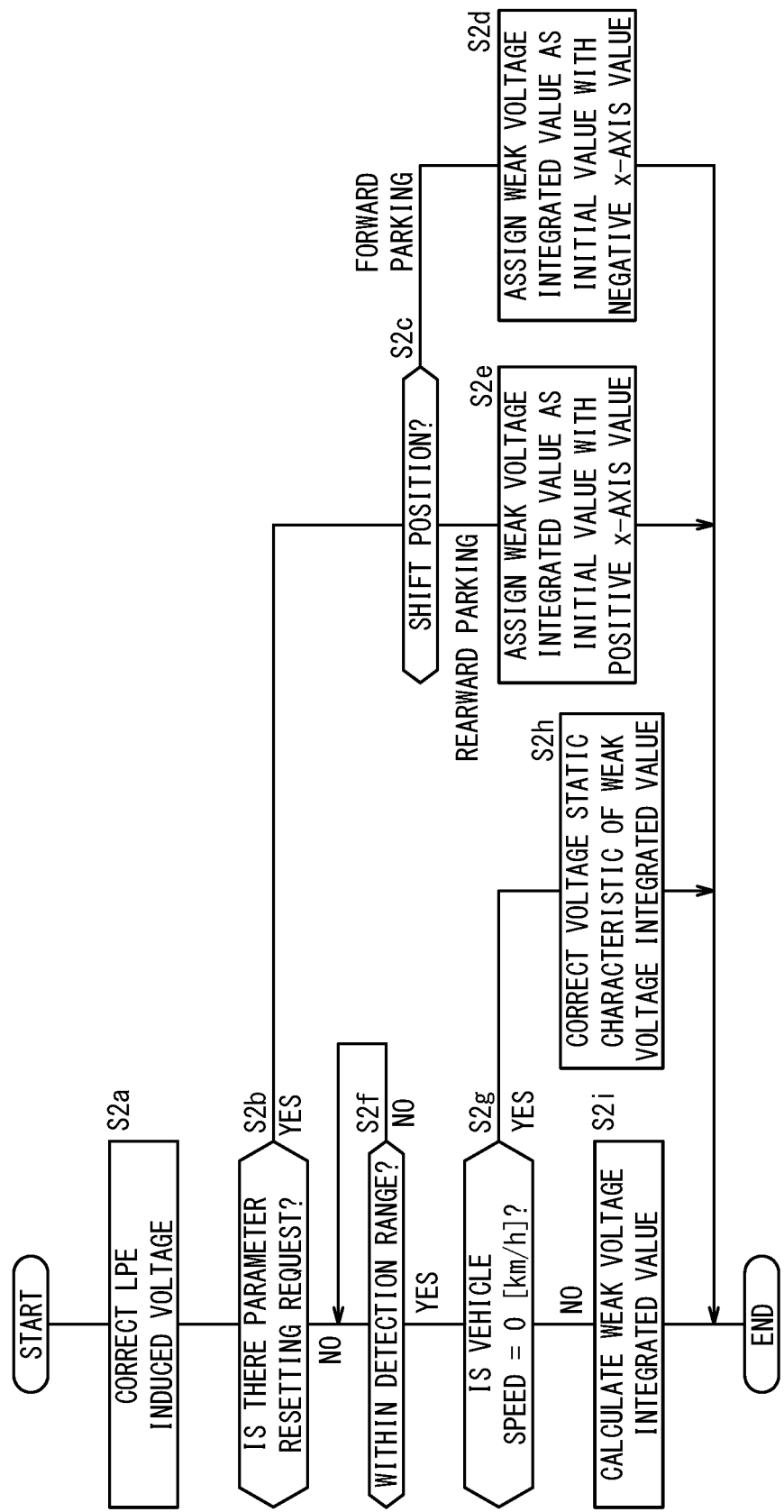
FIG. 16 is a detailed flowchart for describing a calculation process of the weak voltage integrated value.

FIG. 16 is a detailed flowchart of the process of step S2 which is used for describing a calculation process of the weak voltage integrated value vilpe.

In step S2a, in the case that the power receiving coil 12 lies within the close-distance region Dn (see FIG. 6), the weak voltage value vlpe is corrected (LPE induced voltage correction is performed) taking into consideration an influence of an induced voltage generated due to the vehicle speed Vv.

Next, in step S2b, a determination is made as to whether or not the parameter resetting and initialization requests have been made, and in the case of there being such requests (step S2b: YES), then in addition, in step S2c, by referring to the shift position Sp acquired from the shift position sensor 79, the positive/negative determination unit 118 determines whether parking of the vehicle is being undertaken with forward parking or rearward parking.

In the case of forward parking, in step S2d, the weak voltage integrated value calculation unit 115 assigns the weak voltage integrated value vilpe as an initial value of the integrated value, while setting the x-axis to a negative value.

In the case of rearward parking, in step S2e, the weak voltage integrated value calculation unit 115 assigns the weak voltage integrated value vilpe as an initial value of the integrated value, while setting the x-axis to a positive value.

In the determination of step S2b, in the case that the parameter resetting and initialization requests have not been made, then in step S2f, the weak voltage integrated value calculation unit 115 confirms that the power receiving coil lies within the detection range interior region Din. Thereafter, in step S2g, the weak voltage integrated value calculation unit 115 determines whether or not the vehicle speed Vv is 0 [km/h], and in the case of being in a stopped state (step S2g: YES), then in step S2h, a voltage static characteristic correction process of the weak voltage integrated value vilpe is performed.

In the voltage static characteristic correction process, in order to cancel and reset any errors integrated into the weak voltage integrated value vilpe, each of the regions of the very-close-distance region Dc, the close-distance region Dn, and the far-distance region Df is determined from the current weak voltage integrated value vilpe, and for each of such regions, the value on the weak voltage integrated value characteristic 204 corresponding to the value of the weak voltage value vlpe, that is, the reference value, is assigned and reset as the weak voltage integrated value vilpe after having been reset.

In the determination of step S2g, in the case that the vehicle speed Vv is a non-zero value and the vehicle is currently traveling (step S2g: NO), then in step S2i, the weak voltage integrated value calculation unit 115 calculates the weak voltage integrated value vilpe.

Moreover, a case in which the vehicle 20 initiates traveling from a stopped state within the detection range interior region Din is considered, and in such a case, a backup value which was retained when the vehicle speed Vv had become the zero value at the previous time is used as the value of the weak voltage integrated value vilpe.

Figure 17:
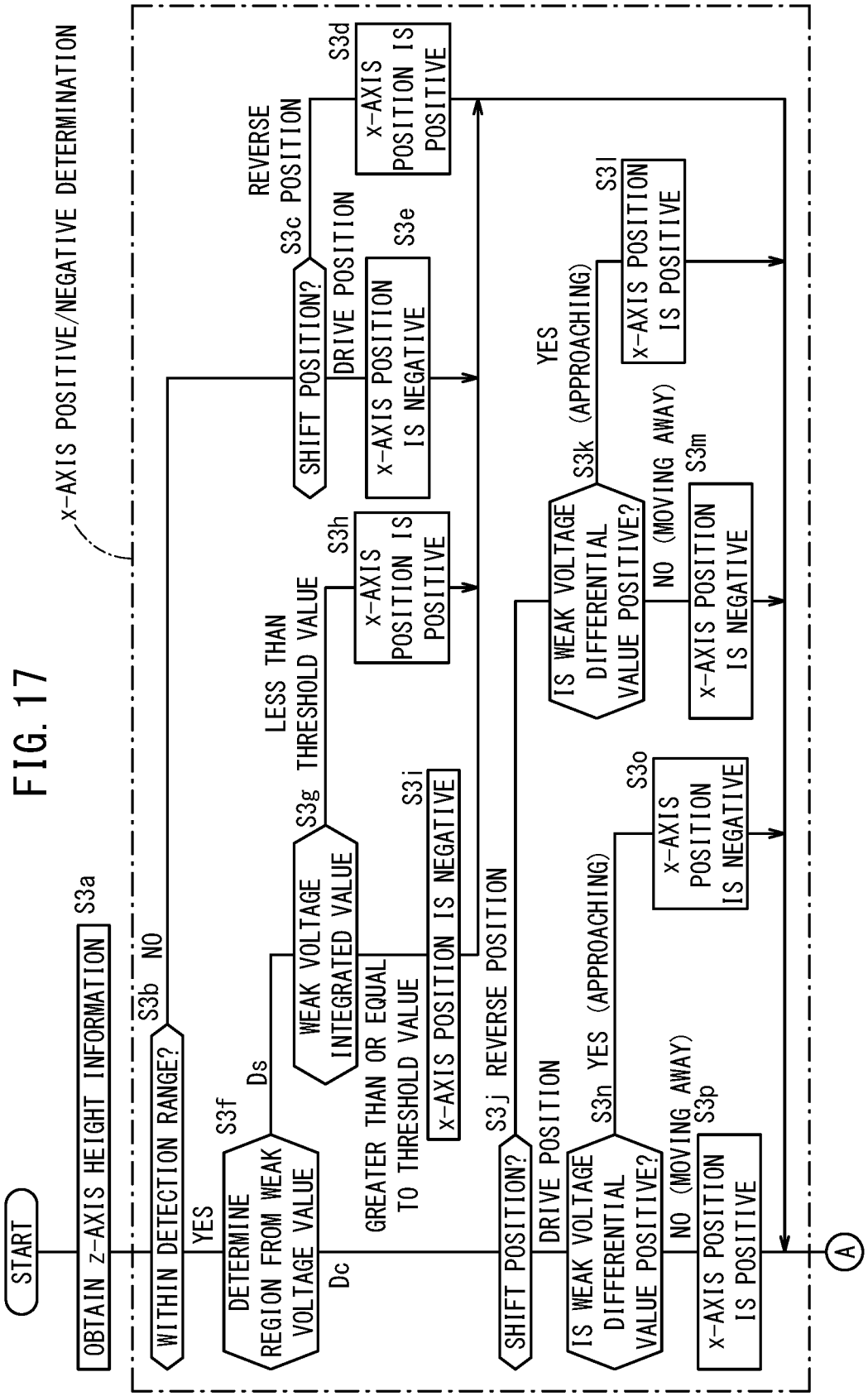
FIG. 17 is a detailed flowchart (1 of 2) for describing a detection process (calculation process) of a relative position of the power reception pad with respect to the power transmission pad.
Figure 18:
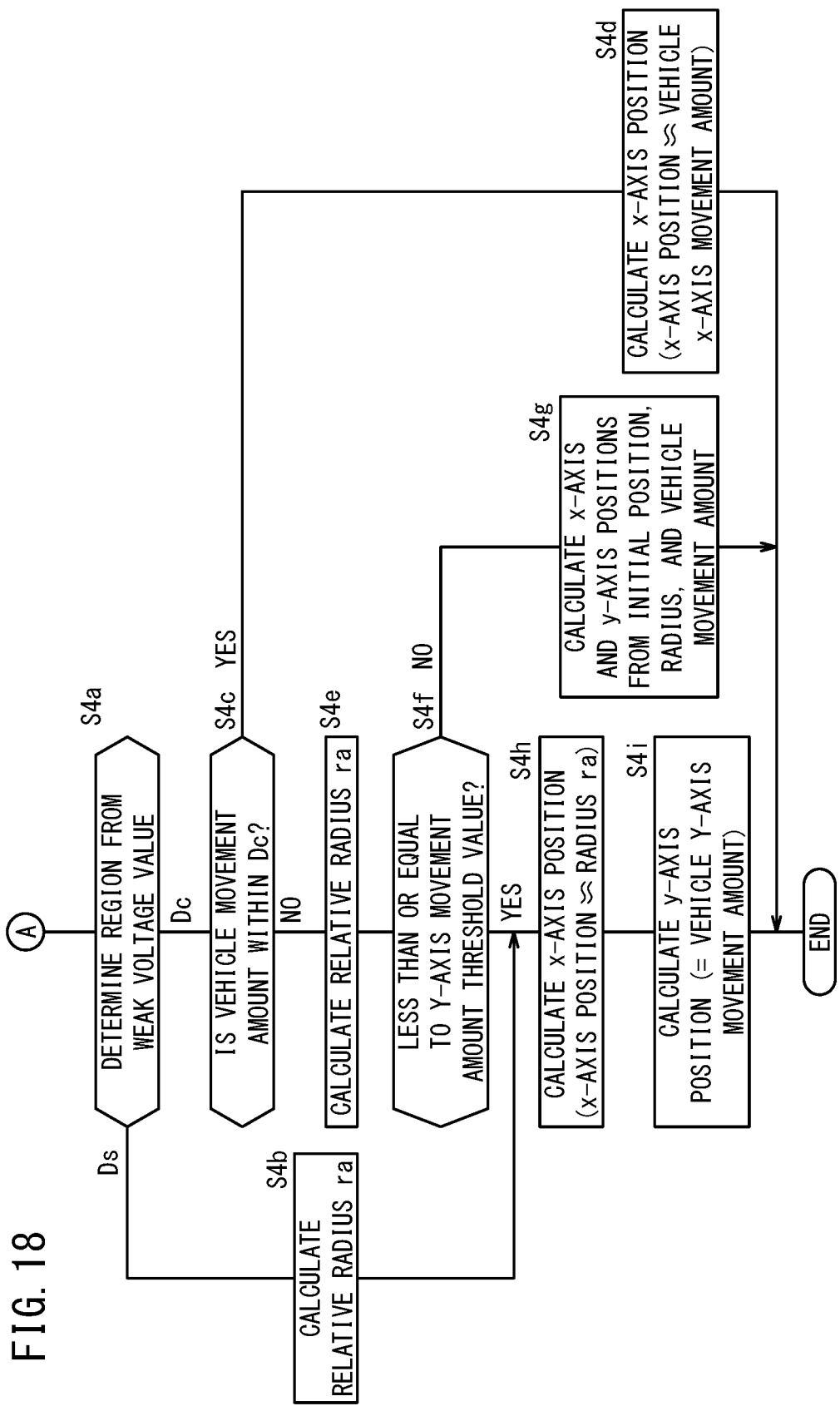
FIG. 18 is a detailed flowchart (2 of 2) for describing the detection process (calculation process) of the relative position of the power reception pad with respect to the power transmission pad.

FIGS. 17 and 18 are detailed flowcharts (1 of 2 and 2 of 2) used for describing, respectively, an x-axis positive/negative determination process of step S3 for the power reception pad (power receiving coil 12) with respect to the power transmission pad 21 (power transmitting coil 11), and a detection process (calculation process) of the relative position of step S4.

In step S1a of FIG. 17, for example, information of the z-axis height zh between the charging station 30 and the power receiving coil 12 is acquired, and a weak voltage value characteristic 202 suitable for the z-axis height zh is set (selected).

In step S1b, the positive/negative determination unit 118 checks the detection range interior/exterior determination result (a flag in the program) of the aforementioned steps S1g and S1h.

In the case that the power receiving coil 12 is not within the detection range interior region Din (step S3b: NO), that is, in the case where the power receiving coil 12 lies within the detection range exterior region Dout, then in step S3c, the positive/negative determination unit 118 checks the determination result of the shift position Sp of step S2c, and if the shift position Sp is the reverse position R, a determination is made that the x-axis position of the power receiving coil 12 is "positive" in step S3d. If the shift position Sp is the drive position D, a determination is made that the x-axis position of the power receiving coil 12 is "negative" in step S3e.

On the other hand, in the case it is determined in step S3b that the power receiving coil 12 lies within the detection range interior region Din (step S3b: YES), then in step S3f, a determination is made as to whether the power receiving coil 12 lies within the very-close-distance region Dc or within the separation distance region Ds.

In the determination of step S3f, for example, if the detected weak voltage value vlpe is greater than or equal to the weak voltage value (threshold value) vlpec (see FIG. 6), the power receiving coil is determined to lie within the very-close-distance region Dc, whereas if the detected weak voltage value vlpe is less than the weak voltage value (threshold value) vlpec, it is determined to lie within the separation distance region Ds.

In the case of lying inside the separation distance region Ds, then in step S3g, a determination is made as to whether the weak voltage integrated value vilpe is less than, or alternatively, is greater than or equal to the weak voltage integrated value (threshold value) vilpec (see FIG. 6).

If it is less than the weak voltage integrated value (threshold) vilpec, then in step S3h, the positive/negative determination unit 118 determines that the x-axis position is "positive", whereas if it is greater than or equal to the weak voltage integrated value (threshold value) vilpec, the positive/negative determination unit 118 determines that the power receiving coil 12 lies within the separation distance region Ds (see FIG. 9) on a side where the vehicle 20 (power receiving coil 12) has passed over the origin point o of the power transmitting coil 11, and in step S3i, the x-axis position is determined to be "negative".

In the determination in step S3f, in the case it is determined that the power receiving coil 12 lies within the very-close-distance region Dc, then in step S3j, in order to determine the positive or negative state of the very-close-distance region Dc, a determination is made as to whether the shift position Sp is in the reverse position R or the drive position D.

If the shift position Sp is in the reverse position R, then in step S3k, a determination is made as to whether or not at least one of the weak voltage position differential value vdplpe and the weak voltage time differential value vdtlpe is a positive value. If the value is positive, since the power reception pad 22 (power receiving coil 12) is approaching the power transmission pad 21 (power transmitting coil 11), the x-axis position is determined to be "positive" in step S3l, whereas if the value is negative, since the power reception pad 22 (power receiving coil 12) has passed over and is moving away from the power transmission pad 21 (power transmitting coil 11), the x-axis position is determined to be "negative" in step S3m.

In the determination of step S3j, if the shift position Sp is in the drive position D, then in step S3n, a determination is made as to whether or not at least one of the weak voltage position differential value vdplpe and the weak voltage time differential value vdtlpe is a positive value. If the value is positive, since the power reception pad 22 (power receiving coil 12) is approaching the power transmission pad 21 (power transmitting coil 11), the x-axis position is determined to be "negative" in step S3o, whereas if the value is negative, since the power reception pad 22 (power receiving coil 12) has passed over and is moving away from the power transmission pad 21 (power transmitting coil 11), the x-axis position is determined to be "positive" in step S3p.

Next, in step S4a of the flowchart of FIG. 18, in the same manner as the determination process of step S3f, the relative position calculation unit 116 makes a determination as to whether the power receiving coil lies within the very-close-distance region Dc or within the separation distance region Ds.

In the case it is determined to lie inside the separation distance region Ds, then in step S4b, the relative radius ra (see FIG. 11, etc.) is calculated with reference to the weak voltage value characteristic 202 and the weak voltage integrated value characteristic 204, with the weak voltage value vlpe and the weak voltage integrated value vilpe treated as arguments, respectively.

In the case it is determined to lie inside the very-close-distance region Dc in step S4a, a determination is further made in step S4c as to whether or not the vehicle movement amount cvp shown in FIG. 11 lies within the very-close-distance region Dc. If it lies inside the very-close-distance region Dc, then in step S4d, the x-axis movement amount xvp is calculated from the weak voltage value vlpe, whereas if it lies outside of the very-close-distance region Dc, then in step S4e, the relative radius ra is calculated from the weak voltage vlpe.

Moreover, in step S4d, the y-axis position is estimated with reference to the weak voltage value characteristic 202 shown in FIG. 12, as was described in the fifth example.

Next, in step S4f, a determination is made as to whether the y-axis movement amount yvp is less than or equal to a threshold value, and in the case of not being less than or equal to the threshold value (step S4f: NO), then in step S4g, an xy-axis position ra(x, y) is calculated, for example using the expressions (10) and (11), on the basis of the initial position xint, the relative radius ra, and the movement amount cvp of the vehicle 20.

In step S4f, a determination is made as to whether or not the vehicle Y-axis movement amount yvp is less than or equal to the threshold value, and in the case of being less than or equal to the threshold value (step S4f: YES), then in step S4h, the x-axis position x is calculated (the x-axis position x approximates the relative radius ra), and in step S4i, the y-axis position is calculated as the y-axis movement amount yvp (see FIGS. 11 and 12).

SUMMARY AND MODIFICATIONS

As described above, the aforementioned non-contact power transmission system 10 is equipped with the charging station 30 having the power transmission coil 11 as a power transmission unit configured to transmit the weak power for positioning, and the vehicle 20 including the power reception coil 12 as a power reception unit configured to receive the weak power in a non-contact manner.

The ECU 60 serving as the control unit of the vehicle 20 comprises the voltage value detection unit 102 that detects the weak voltage value vlpe corresponding to the magnitude of the weak power received by the power receiving coil 12, the position differentiation unit 106p that performs position differentiation of the detected weak voltage value vlpe, in order to determine whether or not the detected weak voltage value vlpe is a voltage value due to the weak power, and the movement displacement amount detection unit 110 that detects the movement displacement amount cvp of the vehicle 20, wherein, during traveling of the vehicle 20 in a manner so that the power receiving coil 12 of the vehicle 20 approaches the power transmitting coil 11, when a position at which the position differential value d(vlpe)/dx of the weak voltage value vlpe calculated by the position differentiation unit 106p exceeds a zero value (for example, the initial detected position +xint shown in FIG. 9) is reached, the position is set to the initial position (cvp=0) of the movement displacement amount cvp of the vehicle 20.

In the foregoing manner, the distance from the power transmitting coil 11 to an outer edge (+xint in FIG. 9) of a weak power detecting range (weak voltage detection range interior region Din(+)) within which it is possible to detect the weak power from the power transmitting coil 11, and more specifically, the distance from the power transmitting coil 11 to the initial position +xint (cvp=0), is stored in advance in the weak voltage value characteristic storage unit 200v using the z-axis height zh as a parameter. Further, during traveling of the vehicle 20 in a manner so that the power receiving coil 12 of the vehicle 20 approaches the power transmitting coil 11, when a position (distance) at which the position differential value d(vlpe)/dx of the weak voltage value vlpe calculated by the position differentiation unit 106p exceeds the zero value is reached, the position (distance) is set to the initial position (initial position for positioning) +xint of the movement displacement mount cvp of the vehicle 20, whereby it is possible to reliably position the power receiving coil 12 with respect to the power transmitting coil 11.

Thus, it is possible to optimize the charging efficiency with respect to the energy storage device 50 of the vehicle 20.

Further, the ECU 60 may be constituted so as to comprise the storage unit 200v, in which there is stored in advance the weak voltage value characteristic storage unit 2020s which defines a correspondence relation (correspondence relation between the weak voltage value vlpe and the movement amount cvp which is the amount of displacement of the vehicle) that associates the position x with the weak voltage value vlpe, from the very-close-distance threshold position xc, which is a position where the weak voltage value vlpe is slightly in excess of the predetermined weak voltage value (threshold value) vlpen, to a position where the weak voltage value vlpe increases monotonically and becomes the maximum peak value vlpemax, and the vehicle speed sensor 74 that detects the vehicle speed Vv of the vehicle 20.

In this case, the movement amount detection unit 110 which serves as the movement displacement amount detection unit calculates the movement displacement amount cvp (cvp=∫Vv·dx or cvp=Vvtar×the required time interval) based on the vehicle speed Vv from the initial position +xint to the very-close-distance threshold position +xc which is a position where the weak voltage value vlpe is slightly in excess of the weak voltage value (threshold value) vlpen which is the side peak value {which may be a very-close-distance position +xbc (see FIG. 9) which is a position where the weak voltage value vlpe has just become the weak voltage value vlpen}, and in addition, calculates the movement displacement amount (distance x) up to the maximum peak value vlpemax, with reference to the weak voltage value characteristic 2020s using the detected weak voltage value vlpe as an argument, from the very-close-distance threshold position +xc which is a position where the weak voltage value vlpe is slightly in excess of the weak voltage value (threshold value) vlpen defined by a predetermined voltage value (or the very-close-distance position +xbc where the weak voltage value vlpe has just become the weak voltage value vlpen), to the center position of the power transmitting coil 11 where the weak voltage value increases monotonically with respect to the displacement position.

In accordance with such a configuration, even if there is a position (bottom position +xb) where the weak voltage value vlpe adopts a minimum value on a route from the initial position +xint to the center position of the power transmitting coil 11, at the position (bottom position +xb) where the minimum value is adopted, the movement displacement amount cvp (x-axis movement amount xvp along the x-axis) is calculated on the basis of the vehicle speed Vv, and as a result, the power receiving coil 12 of the vehicle 20 can be positioned with a reliable and simple configuration from the initial position (initial detected position) +xint of the weak power until reaching the position (maximum peak value detected position) of the maximum peak value vlpemax.

Further, the ECU 60 is equipped with the weak voltage value characteristic storage unit 200v that stores in advance the weak voltage value characteristic 202 from the known initial position +xint up to the position of the power transmitting coil 11, and the vehicle speed sensor 74 that detects the vehicle speed Vv of the vehicle 20.

In this instance, the weak voltage value characteristic 202 is made up from the very-close-distance region Dc, which serves as a near range characteristic in which the weak voltage value vlpe in the radial direction along a cross section in a vertical direction of the weak voltage as detected by the power receiving coil 12 in accordance with the weak power transmitted to the entire periphery in the radial direction from the power transmitting coil 11 decreases toward the outer side in the radial direction from the maximum peak value vlpemax at the center of the power transmitting coil 11, and the separation distance region Ds, which serves as a long range characteristic in which the weak voltage value vlpe becomes the bottom value or the zero value (≈weak voltage threshold value vlpeth) further toward the radial direction, from the bottom value or the zero value, the value thereof further increases toward the outer side in the radial direction and becomes the side peak value vlpen, and from the side peak value vlpen, the value thereof decreases further toward the outer side in the radial direction and becomes the zero value. The movement displacement amount detection unit 110 calculates the movement displacement amount cvp=∫Vv·dx on the basis of the vehicle speed Vv from the initial position+xint to the position (very-close-distance threshold position xc) where the very-close-distance region Dc is reached, and from the position (the very-close-distance threshold position xc) where the very-close-distance region Dc is reached until the center position of the power transmitting coil 11, the movement displacement amount detection unit 110 calculates the movement displacement amount (position x) up to the maximum peak value vlpemax with reference to the weak voltage value characteristic 202 (in the example of FIG. 9, the weak voltage value characteristic 2020s, etc.) inside the very-close-distance region Dc in accordance with the detected weak voltage value vlpe.

In this manner, from the initial position +xint to a position where the near range characteristic (the weak voltage value characteristic 2020s from +xc to 0) can be used, or stated otherwise, until +xc is reached, the movement displacement amount cvp is calculated based on the vehicle speed Vv, and from the position +xc where it has become the near range characteristic until the center position of the power transmitting coil 11, with reference to the weak voltage value characteristic 2020s, etc., using the detected weak voltage value vlpe as an argument, the movement displacement amount (distance x) up to the maximum peak value vlpemax is calculated. Therefore, even if there is a position (the bottom position +xb) where the weak voltage value vlpe adopts a minimum value on a route from the initial position +xint to the center position of the power transmitting coil 11, at the position (the bottom position +xb) where the minimum value is adopted, the movement displacement amount cvp is calculated on the basis of the vehicle speed Vv, and as a result, the power receiving coil 12 of the vehicle 20 can be positioned reliably from the initial position (initial detected position) +xint of the weak power until reaching the position (maximum peak value detected position) of the maximum peak value vlpemax.

Moreover, the weak voltage value characteristic 2020*s* from +xint to +xc is referred to as a long range characteristic, in contrast to the near range characteristic of the weak voltage value characteristic 2020*s* from +xc to 0.

In this instance, the weak voltage value characteristics 2020*s* and 2020*s'* are characteristics in accordance with the z-axis height zh, which is the difference between the heights of the power transmitting coil 11 and the power receiving coil 12 with respect to the horizontal plane, and therefore, by referring to the weak voltage value characteristics 2020*s* and 2020*s'* in accordance with the z-axis height zh, which is the difference in height with respect to the horizontal plane between the power transmitting coil 11 and the power receiving coil 12, it is possible to perform accurate positioning at a location of any known charging station location where such a difference in height (z-axis height zh) is known.

MODIFICATIONS

In the non-contact power transmission system 10 according to the aforementioned embodiment, the vehicle 20 which has received the weak power for positioning that is transmitted from the charging station 30 or the driver of the vehicle 20 carries out positioning of the vehicle 20 with respect to the charging station 30 on the basis of the weak power. However, the present invention is not limited to this feature, and alternatively, the charging station 30 which has received the weak power for positioning that is transmitted from the vehicle 20 may cause the vehicle 20 or the driver of the vehicle 20 to carry out positioning of the vehicle 20 with respect to the charging station 30, on the basis of the weak power and while communicating with the vehicle 20.

In this case, in the vehicle 20, a coil for transmitting the weak power and a coil for main charging may utilize one coil in common, or the coils may be constituted separately. In the charging station 30, a coil for receiving the weak power and the power transmitting coil 11 may utilize one coil in common, or the coils may be constituted separately. The ECU 60 of the vehicle 20 and the power source ECU 61 of the charging station 30 perform signal communications in order, for example, to transmit information from the charging station 30 to the side of the vehicle 20 during positioning, and thereby execute the positioning process in a cooperative manner.

More specifically, according to the present modification, the non-contact power transmission system is equipped with a vehicle including the power transmission unit (power transmitting coil) that transmits the weak power for positioning, and the charging station including the power reception unit (power receiving coil) that receives the weak power in a non-contact manner.

The control unit of the charging station according to the present modification is equipped with the voltage value detection unit that detects the weak voltage value corresponding to the magnitude of the weak power received by the power reception unit, the position differentiation unit that performs position differentiation of the detected weak voltage value, in order to determine whether or not the detected weak voltage value is a voltage value due to the weak power, and the movement displacement amount detection unit that detects the movement displacement amount of the vehicle, wherein, during traveling of the vehicle in a manner so that the power transmission unit of the vehicle approaches the power reception unit, when a position at which the position differential value of the weak voltage value calculated by the position differentiation unit exceeds a zero value is reached, the position is set to a known initial position of the movement displacement amount of the vehicle.

According to the modification, the distance from the power transmission unit to an outer edge of a weak power detecting range within which it is possible to detect the weak power from the power transmission unit, and more specifically, the distance from the power transmission unit to the initial position, is known in advance. Therefore, during traveling of the vehicle in a manner so that the power transmission unit of the vehicle approaches the power reception unit, when a position (distance) at which the position differential value of the weak voltage value calculated by the position differentiation unit exceeds the zero value, the position (distance) is set to the known initial position of the movement displacement mount of the vehicle, whereby it is possible to reliably position the power transmission unit (the vehicle) with respect to the power reception unit (power transmitting station).

The present invention is not limited to the embodiment described above, and it is a matter of course that various additional or modified configurations could be adopted therein based on the content disclosed in the present Description.

The invention claimed is:

1. A non-contact power transmission system comprising a charging station having a power transmission unit configured to transmit a weak power, and a vehicle having a power reception unit configured to receive the weak power in a non-contact manner, a control unit of the vehicle comprising:
a voltage value detection unit configured to detect a weak voltage value of the weak power received by the power reception unit;
a position differentiation unit configured to perform position differentiation of the detected weak voltage value, in order to determine whether or not the detected weak voltage value is a voltage value due to the weak power; and
a movement displacement amount detection unit configured to detect a movement displacement amount of the vehicle,
wherein, during traveling of the vehicle in a manner so that the power reception unit of the vehicle approaches the power transmission unit, when a position at which a position differential value of the weak voltage value calculated by the position differentiation unit exceeds a zero value is reached, the position is set to an initial position of the movement displacement amount of the vehicle.

2. The non-contact power transmission system according to claim 1, further comprising:
a storage unit configured to store a correspondence relation between the weak voltage value and an amount of displacement of the vehicle, the weak voltage value being greater than or equal to a predetermined value; and
a vehicle speed sensor configured to detect a vehicle speed of the vehicle,
wherein, if the weak voltage is less than the predetermined value, the movement displacement amount detection unit calculates the movement displacement amount based on the vehicle speed, and if the weak voltage is greater than or equal to the predetermined value, the movement displacement amount detection unit calculates the movement displacement amount by referring to the correspondence relation in accordance with the detected weak voltage value.

3. The non-contact power transmission system according to claim 2, wherein the correspondence relation is a characteristic depending on a difference in height with respect to a horizontal plane between a power transmitting coil of the power transmission unit and a power receiving coil of the power reception unit.

* * * * *